United States Patent
Yu et al.

(10) Patent No.: US 12,401,395 B2
(45) Date of Patent: Aug. 26, 2025

(54) SATELLITE RADIO ACCESS NETWORK (SAT RAN) BEAM AND GATEWAY SEAMLESS HANDOVER

(71) Applicant: AST & Science, LLC, Miami, FL (US)

(72) Inventors: Zhi Zhong Yu, Reading (GB); Federico Pedro Fawzi, Midland, TX (US); Abel Avellan, Coral Gables, FL (US)

(73) Assignee: AST & Science, LLC, Miami, FL (US)

( * ) Notice: Subject to any disclaimer, the term of this patent is extended or adjusted under 35 U.S.C. 154(b) by 775 days.

(21) Appl. No.: 17/583,992

(22) Filed: Jan. 25, 2022

(65) Prior Publication Data

US 2022/0240151 A1   Jul. 28, 2022

Related U.S. Application Data

(60) Provisional application No. 63/141,218, filed on Jan. 25, 2021.

(51) Int. Cl.
*H04B 7/01*     (2006.01)
*H04B 7/185*    (2006.01)
(Continued)

(52) U.S. Cl.
CPC .......... *H04B 7/01* (2013.01); *H04B 7/18541* (2013.01); *H04W 36/00692* (2023.05);
(Continued)

(58) Field of Classification Search
CPC ..... H04W 36/32; H04W 84/06; H04W 36/18; H04B 7/01; H04B 7/18541; H04B 7/0695
See application file for complete search history.

(56) References Cited

U.S. PATENT DOCUMENTS 10,979,133 B2   4/2021   Avellan et al.
11,121,764 B2   9/2021   Yao et al.
(Continued)

FOREIGN PATENT DOCUMENTS

WO   2019027626 A1   2/2019

OTHER PUBLICATIONS

International Search Report and Written Opinion received in PCT Application No. PCT/US2022/013713, mailed Jun. 10, 2022.
(Continued)

*Primary Examiner* — Ashley Shivers
(74) *Attorney, Agent, or Firm* — Botos Churchill IP Law LLP

(57) ABSTRACT

A LEO satellite communication system is in communication with a first setting satellite having a first field of view including a first plurality of cells, and a second rising satellite having a second field of view including a second plurality of cells. The first and second satellites have an overlapping field of view having an overlapping plurality of cells located therein. A first processing device has a first communication port communicating with a first cell of the first plurality of cells via said first antenna over a first beam, and a second communication port communicating with an overlapping cell of the overlapping plurality of cells via said second antenna over a second beam. Said first processing device switches from said first communication port to said second communication port in response to the first cell of the first plurality of cells moving into the overlapping field of view.

19 Claims, 7 Drawing Sheets

(51) Int. Cl.
  *H04W 36/00*   (2009.01)
  *H04W 36/32*   (2009.01)
  *H04W 84/06*   (2009.01)

(52) U.S. Cl.
  CPC ........ *H04W 36/326* (2023.05); *H04W 36/328* (2023.05); *H04W 84/06* (2013.01)

(56) References Cited

U.S. PATENT DOCUMENTS

| | | | |
|---|---|---|---|
| 2010/0159922 A1* | 6/2010 | Tronc | H04B 7/18591 |
| | | | 455/427 |
| 2017/0041830 A1 | 2/2017 | Davis et al. | |
| 2018/0006711 A1 | 1/2018 | Hreha et al. | |
| 2018/0316414 A9* | 11/2018 | Ravishankar | H04B 7/18541 |
| 2019/0028197 A1* | 1/2019 | Turner | H04B 7/195 |
| 2020/0029265 A1 | 1/2020 | Choquette | |
| 2020/0259250 A1 | 8/2020 | Diamond et al. | |
| 2021/0136641 A1* | 5/2021 | Roy | H04W 36/249 |
| 2022/0141891 A1* | 5/2022 | Masini | H04B 7/18528 |
| | | | 370/316 |
| 2022/0225265 A1* | 7/2022 | Jeong | H04W 76/20 |

OTHER PUBLICATIONS

3rd Generation Partnership Project; Technical Specification Group Radio Access Network; Solutions for NR to support non-terrestrial networks (NTN) (Release 16) vol. RAN WG3, No. V16.0.0 Jan. 16, 2020 (Jan. 16, 2020),pp. 1-140.

Extended European Search Report issued in corresponding European Patent Application No. 22743383.6, mailed Dec. 18, 2024, 10 pages.

Japanese Office Action for Application No. 2023-544512 dated Jun. 6, 2025, 10 pp.

* cited by examiner

SATELLITE RADIO ACCESS NETWORK (SAT RAN) BEAM AND GATEWAY SEAMLESS HANDOVER

CROSS-REFERENCE TO RELATED APPLICATIONS

This application claims the benefit of priority of U.S. Provisional Application Ser. No. 63/141,218 filed on Jan. 25, 2021, the content of which is relied upon and incorporated herein by reference in its entirety.

BACKGROUND

There is a global demand for 100% cellular coverage, and Mobile Network Operators (MNOs) are having a hard time to justify the high cost of deploying the backbone connection or infrastructure for very low or no return in particular the remote areas that have not been covered so far. Current radio access network (RAN), such as 2G, 3G, 4G and 5G services with direct connectivity from User Equipment (UEs), such as mobile phones, to satellites (SAT RAN) do not exist.

On the other hand, satcom has never directly talked to normal 3GPP specs compliant UEs due to the vast number of them and weak signals on the uplink. So far, the satcom is used for base station, such as eNodeBs, backhaul, and that is as far as it goes, as the challenges in directly talking to normal UEs that are powered by small batteries are much higher than to the fixed points or customer premises equipment (CPE) with mains supply. In 2019, ATIS started non-terrestrial network (NTN) study item (SI) and work item (WI) for NR aiming for 3GPP Release 17 specs, that would change both 5G NR UEs as well as gNodeBs. This will not cover legacy 4G LTE, 5G NR UEs, and old 2G phones, which are widely used and remain to be so for very long time, as there are billions of GSM (2G) and LTE (4G) and NR (5G) UEs in the world that cannot be changed for satcom operation, and new NTN approach cannot be applied. There is no satcom solution for 2G, 4G and 5G UEs directly. In addition, a standard BTS (the 2G base station), or eNodeB or gNodeB does not work to communicate via satellite, as it had never been the working assumption of their 3GPP specs for the first 30 years. The ongoing NTN SI and WI is not yet finished. So by 3GPP specs there is no commercial sat RAN so far, and until NTN conclude its WI, there is only specialized sat phone that is very expensive with high radiation to users brain, and most people simply never touched such phone. Furthermore their features are no more than a 2G phone, not really comparable with the simplest LTE phone.

However, this filing will change the two changes: one it will enable sat RAN to cover remote area without towers and infrastructure connecting the towers in terrestrial network (TN); two it actually turns the normal 3GPP UEs, including 2G, 4G and current 5G UEs to sat phone without any modifications. This particular filing teaches an important part of this sat RAN innovative approach, in particular the specific beam handover (BHO) and gateway handover (GHO) for Low Earth Orbit (LEO) sat RAN.

BRIEF DESCRIPTION OF THE FIGURES

The accompanying drawings are incorporated in and constitute a part of this specification which describes the satellite mobility that involves both active UEs and its serving gateway site (GWS). It is to be understood that the drawings illustrate only some examples of the disclosure and other examples or combinations of various examples that are not specifically illustrated in the figures may still fall within the scope of this disclosure. Examples will now be described with additional detail using the drawings, in which:

FIG. 4 illustrates example handover cases.

DETAILED DESCRIPTION

Figure 1:
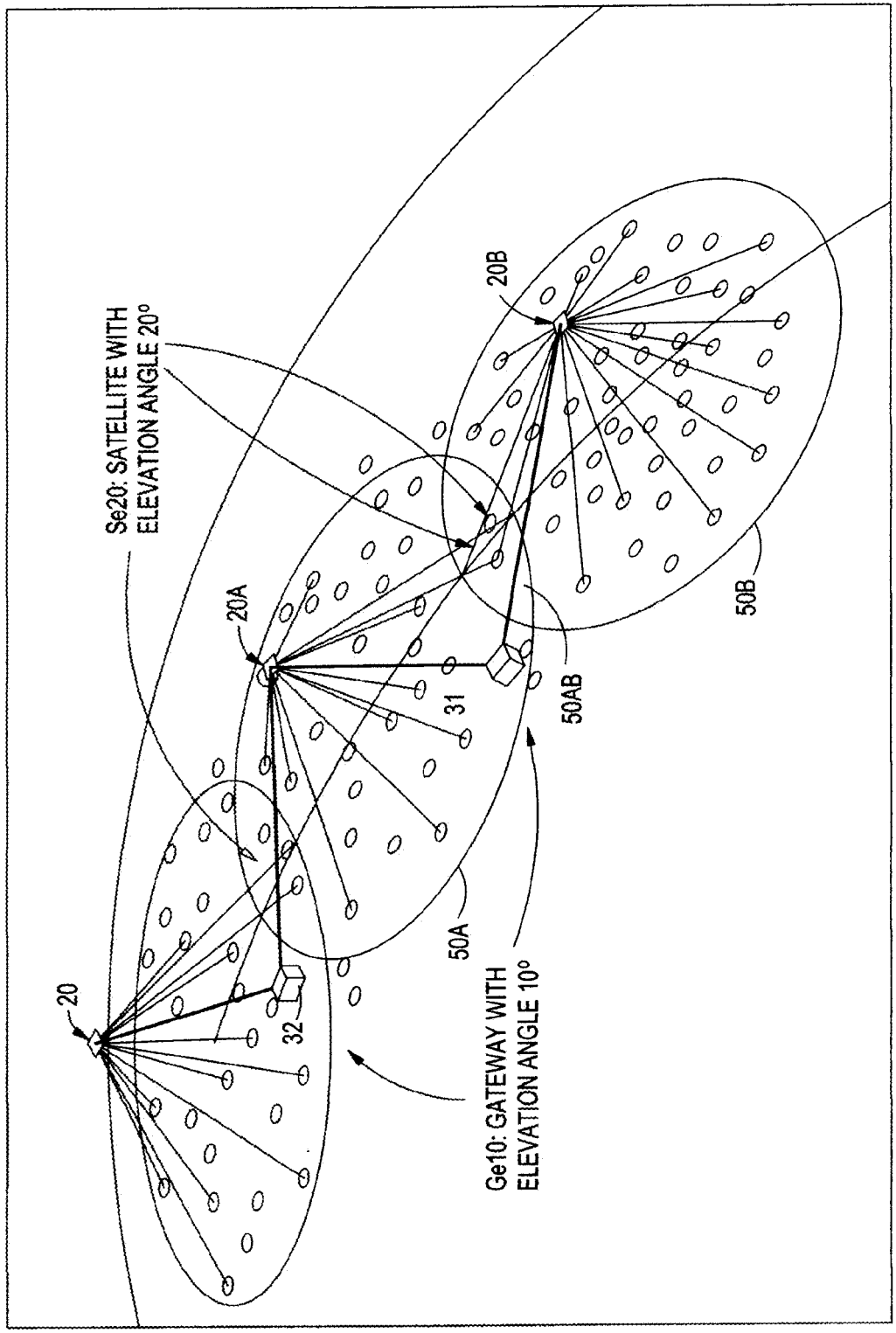
FIG. 1 is an illustration of cells being served by 2 Ge10 (gateway serving satellites defined by the elevation angles no less than 10 degrees) with 3 Se20 (satellite footprint defined by the elevation angles no less than 20 degrees). In particular it highlights the LEO satcom footprints and the overlapping situation where beam handover between two satellites, the setting and rising satellites, happens. The term footprint here means the area inside the field of view (FoV) of the satellite or gateway with RAN (radio access network) support. Footprint can change, for example, most part of the sea is in satellite FoV, and initially had no footprint, but later become sat RAN footprint, e.g. some small islands or oil rigs are likely to be the first footprint of the satellites and gateways.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

A well designed sat RAN system that directly serving legacy 2G, 4G and 5G UEs needs following four basic mechanism, otherwise unnecessary amount of satellites and new UE and base station will be necessary as we can see from star link and NTN 3GPP work item (WI).

1. A large phase array that can form hundreds of electronically steerable beams in order to serve hundreds of cells.
2. Delay and Doppler compensation for each beams to normalize the delay to a constant amount no matter where the ground gateway site (GWS), satellite (sat) and cells are, which enable normal base station to work for sat RAN with simple modifications;
3. The processes or sequences of beam handover (BHO) and gateway handover (GHO) that are needed for LEO satellites.

4. A satellite network control center (NCC) that orchestrates the RAN equipment such as base stations, and space equipment including the ground gateway site and satellites.

This filing will focus on the item number 3, the BHO and GHO.

As used here, the term Handover or Handoff (HO) generally refers to a cell/beam changing from a setting serving satellite to a rising serving satellite. There are several types of handover, namely the 3rd Generation Partnership Project (3GPP) specification UE Mobility HO, the present disclosure provides the extra HO as related to satellite beam HO and GWS HO, which is outside of the scope of 3GPP spec pre-release 16 (before NTN). The innovative part of the present disclosure includes reusing the standard protocol for the BHO and GHO without adding new ones yet streamlining the needed BHO and GHO in sat RAN.

Figure 2:
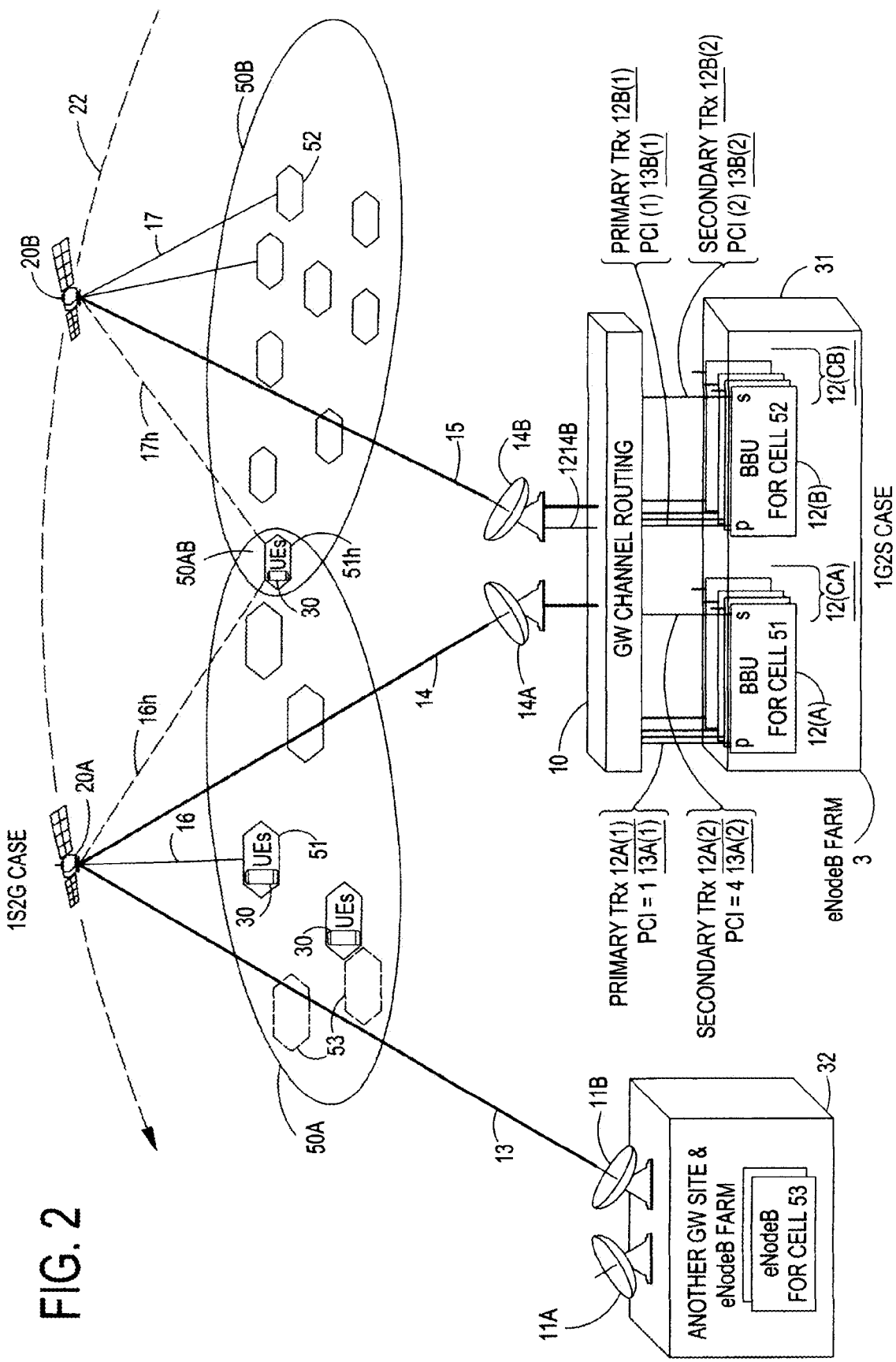
FIG. 2 is an illustration diagram of the 1G2S (1 GWS that links with 2 neighbor Satellites simultaneously) case, highlighting one of the cells in 2 satellites footprint overlapping area going through beam handover; and 1S2G (1 Satellite that has RF links with 2 GWS simultaneously) case for gateway handover.

Referring to FIGS. 1 and 2, low-earth-orbit (LEO) satellites 20A and 20B are tracking their generic cells 51 and 52 being served by individual electronically steerable beams 16 and 17. While orbiting the earth on satellite path or orbit 22 at about 7.5 km/s, the satellite 20A also takes new cells coming into its footprint (or FOV) 50A and leaves old cells 51h that has a period of time in the overlapping area 50AB, within which the rising satellite 20B needs to take care of it by providing a new beam to continue the service for UEs in cell 51h. Same goes with every satellite in the sat RAN constellation.

Changing the UEs' service beams from one satellite 16h to another 17h is the beam HO (BHO) and changing between the satellites' feeder links of gateway tracking dishes 13, 14 and 15 of the same GWS 31 or different GWSs (such as 31, 32) is the gateway HO (GHO). LEO satellites need BHO and GHO for changing their serving GWs and the cells they are serving as they orbit over the cells 51h or GWSs 31, 32. BHO is a process of many active UEs changing the service link for a cell, while GHO is a process of many beams changing the feeder link, e.g. within one GWS, from one gateway tracking dish 14A to another gateway tracking dish 14B of the same GWS 31, or changing from one gateway tracking dish 14A of one GWS 31 to another gateway tracking dish 11B of another GWS 32.

BHO is needed as LEO satellites move in and out of communication with a cell during orbiting while GHO is needed as satellites move in and out of the space where it can communication with a GWS during orbiting. BHO generally refers to the cells 51h changing the satellite with which it communicates, which means that the cell changes the beam that it utilizes to communicate with the satellites. This happens when the cells are in the two satellites field of view (FoV) overlapping area 50AB of the setting satellite 20A and the rising satellite 20B in 1G2S condition, where two HO beams 16h and 17h are overlaid on the BHO cell 51h. Before the BHO, the cells (such as 51) communicate over a first tracking beam 16 for a descending or setting satellite 20A. During handover, the cells (such as 51h) switch from beams 16h of the setting satellite 20A to beams 17h of the ascending or rising satellite 20B. For example, eNodeBs (such as eNodeB 12(A)) may be configured to communicate with the UE in cell 51h to control the UE in cell 51h to directly communicate with the second rising satellite 20B. BHO is done or performed on active UEs, and on UE by UE basis. Accordingly, after BHO, the cells communicate over the beams 17 for the rising satellite 20B and become one of its cells 52 being served. The respective eNodeB (such as 12(A)) may switch its interface (such as gateway antenna) from 14A to 14B, and the corresponding cell downlink (DL) and uplink (UL) data change from feeder link 14 to 15 accordingly. This is an important procedure in forming GHO, as a GHO is done through many BHOs.

eNodeB (eNB) is the 4G base station that can serve one or more 4G cells. In this description we use eNodeB for one cell base station as well as a number of cells whichever is relevant. Also it is interchangeable with 2G BTS and 5G gNodeB (2G and 5G base stations)

In some examples, a gateway, in sat RAN, may has a tracking dish antenna that serves a satellite. Since the satellites are directly talking to normal UEs on ground, LEO satellite is needed rather than MEO and GEO satellite, and satellites are tracking their serving geographical cells on the ground using their beams. GHO can refer to the satellite feeder link change from 14 to 15, and this is on the granularity of a cell, hence is "on the cell-by-cell basis", while BHO is on the UE-by-UE basis. So GHO can be between GW tracking dishes in one or more GWSs.

GHO in one GWS may refer to the cells' signal moving from one tracking dish 14A to another, 14B, within the same GWS 31; while GHO between two GWSs 31 and 32 may refer to a satellite changing GWS-satellite (GW-SAT) feeder link from feeder link 14 to feeder link 13 while satellite 20A orbiting on the orbit or path 22. Before GHO, the satellite 20A communicates with a first GWS 31 over a first GW-SAT link 14. During the GHO, the satellite 20A also communicates with the second GWS 32 over a second GW-SAT link 13 as shown in FIG. 2 in 1S2G condition.

GHO is performed on a cell by cell basis over the period when the satellites cover the cells served by the eNB farms belong to the GWS. After GHO, the satellite 20A communicates over the second GW-SAT link 13 with the second GWS 32.

GHO can be done or performed in 1S2G (1 satellite in communication with 2 GWSs) condition and 1G2S condition. Se20 refers to Satellite with its Footprint defined by the minimum elevation angle of 20°. GWe10 refers to a gateway dish antenna with minimum elevation angle of 10°. An elevation angle refers to the angle between the horizontal surface at the point under the concern on earth to the intended direction of the subject. GW elevation angle refers to the tracking dish angle with respect to the horizontal surface at the GW sitting point, while satellite elevation angle refers to the angle of the beam coming down from the satellite with respect to the horizontal surface on the observation point (such as the cell center).

HO Failure (HOF) refers to Handover failure (R12 enhancement to be used). A 1G1S (1 gateway in communication with 1 satellite) is the satellite and GWS relative position where a GWS only has one link with one satellite, a case that requires serving area is smaller than the satellite footprint in the period when satellite beams only need to track the cells in the serving area and eNBs for those cells are hosted in one GW site.

Both of the two types of GHO are done over a period of time, on cell-by-cell basis, composed of many BHOs.

The present disclosure handles satellite mobility which relay GSM (2G), LTE (Long Term Evolution, such as 4G) and 5G new radio (NR) signals to and from unmodified GSM/LTE/NR UEs as an extra BTS/e/gNodeB functionality. The satellite mobility management is outside 3GPP specifications and will be a new base station background activity that involves standard UE handover procedures, while satellites and gateways coordinates, but no further complexity as to manage which sat and GW it needs to link with. The RF paths are handled by satellites ground station. Neither the feeder link, nor the service link details are handled by eNB and UE (The 3GPP equipment for 2G/4G/5G). The sat RAN design disclosed here makes those satellite complexity totally transparent to base stations and UEs, while maintaining their RF connections.

The present disclosure provides Low HOF and achieves synchronized HO, Efficient eNodeB and GWS distribution, Quality of Experience (QoE), reduce or minimize voice and data calls interruptions and provide a good user experience.

A single satellite orbital plane is shown in the figures, such as the equatorial one, though any suitable orbit can be handled. This approach can also be applied to Inter-plane HO.

Beam Handover

Turning to the drawings, FIG. 2 shows a gateway site or ground station 31 in accordance with one embodiment of the present disclosure. The gateway site 31 includes gateway channel routing block 10 that provides the right channels signal for corresponding to two antennas 14A and 14B, which are directional antennas tracking the satellites, and a plurality of eNodeBs, like 12(A) and 12(B) for every geographical cell. The gateway site 31 is in communication with User Equipment (UEs) via a setting satellite 20A and a rising satellite 20B. The satellites 20A, 20B communicate with the UEs over a respective setting TRx beams 16 and rising TRx beams 17. UEs can be in an idle state and those UEs would only monitor the cells and carry out cell reselection and tracking area update when needed (e.g., for paging), there is no need for the eNodeBs to take care of them in BHO. The BHO takes care of the active UEs only. The active UEs are or include the UEs in a call, and need eNodeB dedicated control to move from setting satellite beam to the rising satellite beam. The gateway channel routing block 10 manages the required channels for satellites 20A, 20B, so that they provide the scheduled services to the cells intended dynamically. All the channels/cells signal served by a satellite is packed together and passed between GW and satellite via feeder link (different from the MVO's LTE spectrum) beams 14 and 15, while each cell being served by the satellite uses MNO's spectrum via electronic steerable beams The gateway site 32 includes gateway antennas 11A, 11B, with respective to their serving eNodeBs (such as BBUs for cells 53). The feeder link beams 14 and 15 may, for example, have a wide bandwidth with frequency of 40-50 GHz. And the service link beams are controlled by a Network Mobile Operator (NMO).

FIG. 1 shows the satellites 20A, 20B's RAN (radio access network, e.g., GSM, LTE and 5G NR) signal footprints or field of Views (FoV) 50A, 50B on the Earth surface. The setting satellite 20A has a setting satellite FoV 50A, and the rising satellite 20B has a rising satellite FoV 50B. The setting and rising FoVs 50A and 50B, in which that satellites communicate with UEs directly in their cells with serving beams on downlink (DL) and uplink (UL). The setting and rising FoVs 50A and 50B overlap (or at least partially overlap) in the overlapping area 50AB. In accordance with one embodiment, BHO occurs for the cells 51h located inside the overlapping FoV area 50AB.

FIG. 2 shows the ground cells being served by the two satellites 20A, 20B, which are linked to the gateway channel routing block 10, via gateway antennas 14A, 14B that interface with the respective processing devices (i.e., eNodeBs) 12 serving those ground cells. The processing devices 12 control communication with the UEs via the satellites 20, 20A, 20B (also see FIG. 1). In particular, FIG. 2 illustrates one embodiment of a system, including a 1G2S (1 Gateway links with 2 Satellite) mobile communication system 5, though other configurations can also be handled. As shown, the satellite communication system 5 includes a base or ground station 31, which contains a farm (such as an eNodeB farm) 3 and GW channel routing block 10 that communicate over two satellites 20A, 20B, and multiple UEs 30 in a beam HO cell 51h in the satellite overlapping area 50AB (here, overlapping ground cells are labelled 51h and non-overlapping cells are labelled 51, 52. The cells 51 will change to cells 52 as the satellites orbit around the earth on path 22). In certain examples, a gateway may include gateway antennas 14A, 14B and the gateway channel routing block 10.

In some examples, the ground station 31 has many base station BBUs, e.g. eNB farm and minimum of two directional antennas 14A, 14B via a gateway-satellite feeder link 14, 15 respectively carrying the BTS/LTE/5G downlink (DL) and uplink (UL) signals for their footprints 50A, 50B. The drawing highlights one of the HO cells 51h in the overlapping area 50AB, to illustrate where BHO happens. One or more UEs are in the BHO cells 51h. The processing device 12 can be, for example, a server or computer such as RAN base station forms, such as BTS for GSM, eNodeB for LTE and gNodeB for 5G, which transmit (Tx) and receive (Rx) LTE signals and can communicate with a GWS device that is located at the ground station. The satellites 20A 20B are in communication with the ground station antennas 14A, 14B. The first satellite 20A is setting, i.e., leaving the current footprint 50A for the ground station antenna 14A, and the second satellite 20B is rising or ascending, serving the footprint 50B for the ground station antenna 14B.

GWS 31 may use feeder link tracking antenna 14A and 14B in Q/V bands, for example, for the gateway-satellites feeder links 14, 15. Satellites 20A and 20B use operators' LTE spectrum as the service links for UEs via RF beams, like 16, 17 for respective cells in their footprints.

In FIG. 1, 2, for the cells in the overlapping area 50AB, the serving BBU is told by sat RAN control center the period for BHO for active UEs in polarity of HO cells 51h, e.g., in one or more HO cells 51h. That is, as the cells 51 enter the overlapping area 50AB, a satellite beam handover process is triggered to switch communication for those overlapping cells 51h from the setting satellite beams 16h to the rising satellite beams 17h. It is noted that beams 16h and 17h are slightly different from other beams of 16 and 17, as beams 16h and 17h are from the same eNodeB in BHO, which used to be associated with the setting satellite 20A, but in beam HO, the eNodeB is associated with both setting and rising satellites 20A and 20B. The beam 16h keeps the same as beam 16 keeping the first PCI (Physical Cell ID) 13A(1), except during BHO its top priority is not on data traffic, but the active UEs HO to beam 17h could be one of the cells MIMO RF port, or newly started BBU/cell by the same serving eNodeB, so that 16h and 17h form coherent Rx signals just like MIMO signals. on the other RF port or BBU with a different PCI 13A(2) via rising satellite 20B, and the choice of the PCI pair are such they don't interfere with each other, which enable them work like MIMO, enhancing each other. So beam 17h is newly added to the rising satellite beams and 16h and 17h coexist for the BHO period. Hence the BHO only happens in satellites' overlapping cells of the setting satellite 20A and the rising satellite 20B. The HO beam 17h keeps the same configuration for user traffic and becomes one of the beams 17. The 3GPP specifications only have mobility management for UEs moving between the cells. Satellites relay and their mobility are not part of 3GPP specifications. Most active UEs in HO beam or cell will end up Radio Link Failure (RLF) if HO is not successful when instant hard switching from setting satellite 20A to rising satellite 20B is used.

To enable satellite mobility, the present disclosure provides a BHO condition or method that applies existing 3GPP HO procedures to achieve BHO. According to 3GPP specs each eNodeB by default has a minimum of two RF ports, the signals of which go through two separate TRx GWS-satellite feeder links 14, 15, and then satellite uses MNO's spectrum for beams, the service links 16h, 17h (both DL and UL) from the two satellites 20A, 20B, where 16h and 17h are overlaid onto the BHO cells 51h in the overlapping area 50AB during the BHO period. FIG. 2 shows a cell's eNodeB 12(A) with two RF ports 12A(1) and 12A(2) delivers the DL and UL LTE signals through two GW antennas 14A and 14 B that serve two satellites 20A and 20 B, each baseband unit (BBU) of a cell providing a beam signal for HO service link 16h/17h via feeder link 14/15 for two TRx path to the two RF ports 12A(1) and 12A(2) on the eNodeB 3 BBU 12(A). Note that the newly added beam 17h starts communicating with the target GW antenna 14B shown as a thin line interface 1214B, which is the new BHO signal newly applied to BHO cell 51h by the new beam 17h from target satellite 20B purely for BHO from 20A to 20B. To UE this appears as a new cell, as 1214B uses another PCI 13A(2) in contrast to the source cell's PCI 13A(1). The two beams 16h and 17h act as serving cell and neighbor cells respectively during BHO period, and 16h, as the source cell should set access barring state on system information, so that it will inform UE(s) to leave it as soon as they can (idle UEs make cell reselection; and UEs just finished BHO will not coming back to it; newly powered on UE would not RACH to it), so that 16h will relinquish the service to 51h and totally HO to 17h. On 20B side, when all the active UEs are moved over to 17h, BHO procedure for the cell is finished and cell 51h becomes a generic cell 17 in 20B's FoV. The new target cell is born, and core network will keep the same tracking area code/location area code (TAC/LAC) so that UEs moved to new cell will be paged via beam 17h instead of 16h, as 16h after the BHO no longer serves the UEs.

There are two PCIs (or cell color codes or BTS color code or training sequence code in 2G) assigned to each cell, and they are used alternatively at each BHO instance. For PCI deployment their reference signals RE position needs to be carefully considered so that the source and target cells; reference signal are not on the same RE to cause interference on UE side. The two cells should work like the two layers in MIMO setup, so that they help each other rather than cause trouble to each other.

It is worth mentioning that BHO is mainly the procedure for PRACH channel, and all the traffic channel PDSCH and PUSCH can carry on as standard HO does, so that BHO is seamless.

Further, after the BHO and when the beam 17h becomes one of the beam 17, it will be packed with the current cells in 50B, and become an integral part of the eNodeB 12(B), and feed to the gateway antenna 14B interface in the IQ stream, and such signal is handed over from eNodeB 12(A) to eNodeB 12(B) and from GW Antenna 14A to GW antenna 14B, and from feeder link 14 to feeder link 15 to achieve BHO from satellite 20A to satellite 20B. The data for the BHO cell is no longer needed from 20A and will come from 20B. This can be treated as 2 cell HO as well. Note that no extra hardware is needed as by default there are two RF port for each cell and BHO can just borrow one of them for short period of time, assuming the initial sat RAN of providing coverage on global scale uses 1T1R to save feeder link bandwidth. In MIMO operation, one port can be temporarily used for BHO.

The power levels from the two RF ports (e.g., two communication ports) 12A(1) and 12A(2) via setting and rising satellites are similar, and there is no HO cell edge condition as for a terrestrial network. The BHO has such beam overlay on top of each other, so the whole cell has equally good signals from symmetrical beams of two satellites. The geometry of the overlapping area is such that most of the RF paths (or beams) 16h, 17h are symmetrical to the cell, however the locality could make some difference when terrain is uneven. But for remote area coverage there are mostly the same statistically. So the majority of BHO is smooth, except perhaps when one side has a blocked path (such as by a mountain), say on beam 17h. Although this should be handled at cell planning to avoid such situation, there are always some exceptional cases, such as a tunnel or building may have the same effect, as all wireless communications have.

In operation, the cells 51, 52 in the FoV of each satellite 20A, 20B communicate with a respective eNodeB BBU 12(A), 12(B) over a designated RF port. Specifically, the cells 51 in the FoV for the setting satellite 20A communicate over a first beam 16 via the setting satellite 20A. The setting satellite 20A, in turn, communicates with eNodeB farm's one or more first BBUs 12(A) of cluster 12(CA) at the gateway site 31 over a primary RF Transmit/Receive (TRx) port 12A(1), via the first GW antenna 14A. And the cells 52 in the FoV for the rising satellite 20B communicate over a second beam 17 via the rising satellite 20B. And the rising satellite 20B communicates with eNodeB farm's one or more second BBUs 12(B) of cluster 12(CB) over a primary RF TRx port 12B(1), via the second antenna 14B. Each eNodeB communicates with a single cell 51, 52.

A smooth and seamless BHO is triggered as cells enter the overlapping region 50AB. In the beam HO moment, the two RF ports (such as 12A(1) and 12B(1)) are utilized separately, but for simplicity we just illustrate SIMO (Single Input Multiple Output) configuration for both satellites. All of the cells 51, 52 in non-overlapping areas are using just one of the two RF TRx ports 12A(1) or 12B(1) respectively, and each footprint has their own beams 16, 17 for normal user data traffic operation.

However, within the overlapping area 50AB, the cells 51h are engaged in beam HO and gateway handover. In the example embodiment of FIGS. 2-3(a)-(c), the beam handover refers to the process for moving from the first set of eNodeBs 12(A) to the second set of eNodeBs 12(B) and switching from satellite 20A to satellite 20B. The gateway handover (GHO) can refer to the process for moving from the first antenna 14A to the second antenna 14B.

At the outset, the cells 51 are communicating with the first eNodeB farm 3 BBU 12(A) of cluster 12(CA) for the satellite 20A over the primary ports 12A(1) using PCI 13A(1) via the first GW antenna 14A. Once the cells 51 enter the overlapping area 50AB, they also communicate with the secondary port 12A(2) of the same eNodeB farm 3 BBU 12(A) but with a different PCI 13A(2) via the GW antenna 14B and rising satellite 20B. At this point, the eNodeB 12(A) enables the secondary TRx port 12A(2), which communicates via the second GW antenna 14B to the rising satellite 20B over beam 15 and with the cell via a new beam 17h. In this way, the beam from the satellite 20A can start the HO from serving beam 16h to serving beam 17h.

Accordingly, as the setting satellite 20A continues to set and the rising satellite 20B continues to rise, the cells 51 will move from the setting FoV 50A into the overlapping region 50AB, and into the rising FoV 50B. As they pass into the overlapping region 50AB, the ground cells 51 is changed to 51*h* when BHO procedure is performed. The essential part of the BHO is to provide another "fake cell" from the rising satellite 20B with a different PCI to the same geographically the same cell to 51*h*—the new target cell from the rising satellite 20B. The new cell needs another process device called base band unit (BBU) in eNB farm 3, and generally by default there are 2 BBUs, each with their RF port form primary and secondary TRx, for each cell. The illustration below make use of the two TRx of a cell, but any other BBU resources from the eNB farm can also be used to provide the new BHO cell 17*h*.

For example, BBU-p 12(A) in the eNodeB farm 3 is serving the cell 51, and the satellite network control center (NCC) informs eNB and BBU-p that 51 becomes 51*h*, so that eNB switches on or turn the secondary BBU-s and RF port 12A(2) to a target cell in addition to the primary RF port 12A(1) of the eNodeB in 12(A). The first antenna 14A still carries the setting beam 16 for the BHO purpose and is labelled as 16*h* in the BHO process, the secondary RF port 12A(2) for the same eNodeB 12(A), is now taking the target beam route, i.e., the second antenna 14B (which tracks that rising satellite 20B). Once it is communicating over the secondary port 12A(2) via the second antenna 14B and the rising satellite 20B to the active UEs in cell 51*h*, it ceases communication over the primary port 12A(1) and the first antenna 14A. Those cells will continue to communicate with the eNodeB 12(A) over the secondary RF port 12A(2) and the second antenna 14B (where the respective BBU 12(A) may become or be taken as BBU 12(B), and the respective secondary RF port 12A(2) of the BBU 12(A) may become or be taken as the primary RF port 12B(1) of the BBU 12(B)), until a new rising satellite comes along, at which point it will switch to communicating with the new rising satellite over the first antenna 14A and the port 12A(1) for the first BBU 12(A). BBUs 12(A) and 12(B) are one of the signal processing unit in the cluster of them 12(CA) and 12(CB) respectively, which illustrate the processing devices that dynamically service GW tracking dish 14A and 14B respectively on most cells in their FoVs, except for BHO cells there are two RF ports for each HO cell, hence the source cell will use both 14A and 14B simultaneously via the two RF ports p and s as shown in BBUs. After the BHO the BBU of the cell will be conceptually transitioned from 12(CA) to 12(CB). The pool of BBUs serving the tracking dishes are not static as the satellites serve different ground cells under its orbit, where GW channel routing block 10 carries out the channel routing function under the supervision of NCC. The gateway channel routing block 10 at the gateway site 31 routes or connects the port 12A(1), 12A(2), to beams 16*h* and 17*h* respectively, with the appropriate antennas 14A, 14B, where beam 17*h* signal on GW antenna 14B is shown as (or corresponds to) a separate thin line 1214B (e.g., a separate thin line interface) in the GW or GW antenna 14B's IQ interface streaming, meaning the corresponding eNB starts to handle its cell 51*h* BHO.

By default, an eNB (i.e., eNodeB) 12 has two RF ports, in terrestrial network (TN) they are transmitting signals for one cell (the same PCI). we are using two ports in beam HO but each of the 2 ports labelled as (1) & (2), sending signal from the same eNB but with two different Physical cell IDs PCIs (13A(1), 13A(2)). However, they can be the same cell from one eNB that operationally are distinct to be associated with different cells, as one PCI needs to correspond to satellite 20B and gateway antenna 14B. So the beam can come from the rising satellite 20B, and a different PCI would cheat UE to think that another neighbor cell is available, and HO procedures and protocol can be used to let the current beam of 12A(1) HO to 12A(2), it may be just the same cell from the same eNB, but using its 2 RF ports via 2 GWs and 2 satellites are "Ncell" for the purpose of beam HO.

Each eNB's RF ports can be switched to any GW antenna (14A or 14B), and the items associated with the two GW antennas 14A, 14B in FIG. 2 are distinguished by A & B respectively, so 12(A) is one of the eNBs that sends its signal to GW antenna 14A, while 12(B) is another eNB sends its signal to GW antenna 14B normally. However, during the beam HO, 12A(2) can start to stream to GW antenna 14B, as a step of HO, and ports (1) & (2) can start to map to A & B, which are the Sat/GW antenna labelling, reflecting the innovative part of the BHO mechanism for UE to have a smooth HO.

So 12(B) refers to those eNB serving the cells 52 in the footprint 50B, while RF port 12A(2) corresponds to the BHO cell 51*h* that is in the transition from cell 51 in the footprint 50A to cell 52 in the footprint 50B via the 2nd RF port 12A(2), pretending that the BHO cell 51*h* is a cell 52. RF port 12A(1) corresponds to cells 51 in the footprint 50A, and goes or communicates through GW antenna 14A. RF port 12A(2) is added one by one to GW antenna 14B for BHO when respective cells 51*h* are in the overlapping area 50AB. For handling unmodified UEs, RF port 12A(2) is used during BHO.

FIGS. 3(*a*), 3(*b*) and (*c*) shows the interaction between the active UEs 30, the eNodeB 12(A), and the gateway channel routing block 10, and how they work or operate together for BHO. The BHO uses CFRA (contention free random access) under eNodeBs control for smooth and seamless BHO. UEs in idle state does not need any eNodeB help like that. After BHO, UEs in idle state perform cell reselection, as mentioned above, and use CBRA (contention based random access) to be served by the eNodeB when needed.

Just as what CFRA intended by 3GPP specs for UE HO between cells, the arrow diagram shows how the condition is formed so that CFRA are pre-scheduled and MSG1 to MSG2 are well prepared to have the proper TA for each UE in BHO, which makes the HO perform as a perfect synchronized HO.

In certain examples, when overlaying two HO beams 16*h* and 17*h* to the BHO cell 51*h*, PCI values on the two RF ports are selected to avoid CRS RE overlay and minimize or reduce the interference to each other, and two beams frame structure is given time offset such as 1.5 ms to avoid MIB, SSS, PSS SSB (for 5G) and SIBs overlapping, so that active UEs can easily tell them apart and get the two cells details distinguished.

In other examples, the gateway site 31 may be configured to, e.g., via eNodeB 12(A), identify active user equipment (UE) in the cell 51*h* in the overlapping area 50AB (or to determine whether there is active user equipment (UE) in the cell 51*h* in the overlapping area 50AB), and apply a hard beam handover from the setting satellite 20A to the rising satellite 20B (e.g., switching off the source beam such as 16*h* and at the same time switching on the target beam such as 17*h*), in response to no active UE being identified.

One Gateway Site Links to Two Satellites at the Same Time (1G2S)

FIGS. 1, 2 show one gateway site 31 and two satellites 20A, 20B. The two satellites 20A, 20B are served by the same GWS (1G2S), the gateway site 31 can have multiple gateway antennas (the tracking dish antennas) 14A and 14B serving multiple satellites. BHO from satellite 20A to satellite 20B can use two dish antennas 14A, 14B to track their serving satellites 20A, 20B, respectively. The beam 16 serves the cells in FoV (or footprint) 50A of satellite 20A, and the beam 17 serves the cells in FoV (or footprint) 50B of satellite 20B. In the embodiment shown, each satellite (e.g., 20A, 20B) communicates with an eNodeB farm 3, at any time each satellite needs or can communicate with a cluster of one or more eNodeBs 12(A) or a cluster of one or more eNodeBs 12(B) in eNodeB farm 3 (e.g., on the ground co-located with the GW antennas 14A, 14B to form the GWS 31) to provide LTE services where each cell is served by an eNodeB in the respective cluster of eNodeBs. Cells 51 in the setting satellite FoV 50A have been served by the cluster of eNodeBs 12(A) via satellite 20A during its pass. Near the end of satellite 20A's service (before the cells being left outside of its FoV), cells 51 are on satellite overlapping region 50AB, and can go through BHO in the example processes as described below.

1. Two overlapping beams 16h and 17h can be applied to the BHO cells, and the BHO cells are now labelled 51h.
2. The serving beams 16 are changed to the HO sourcing beams 16h. The HO sourcing beams 16h are almost the same as beam 16, and continue using PCI 13A(1), but the priority of the beam 16h is now for BHO. FIG. 3 illustrates the main function of beam 16h, and beam 16h can work with its counterpart of 17h to accomplish BHO smoothly.
3. Target HO beams 17h are also similar to the beams 16, but with alternative PCI 13A(2) and come from another RF port of the same eNodeB 12(A).

As shown in FIG. 2, beam 16h is served as usual by the eNodeB 12(A)'s primary TRx port 12A(1) with PCI 13A(1), while target beam 17h is new HO beam from the same eNodeB 12(A), but from the secondary TRx port 12A(2) using new PCI 13A(2) via the target satellite 20B. After the HO, beam 17h from the 2nd RF port of the same BBU (no eNodeB HO here if the cell BW is the same, but beam HO. This is satellite mobility, not UE mobility handling, hence keep the same eNodeB) can become new target beam 17. Further, the same serving eNodeB BBU can leave cluster 12(CA) for BBU 12(A) and join the cluster 12(CB) for BBU 12(B) to become one of the BBU serving the rising satellite 20B. The BHO is achieved by overlaying the target HO beam 17h on the same cell that is currently covered by the source HO beam 16h. In the case when cell BW needs to be changed BHO is a good opportunity to use another BBU that is configured for the new demanded cell BW (CBW), where the example of primary and secondary RF ports of the same CBW above need necessary adaptation for the new CBW. However the ping-pong PCI deployment and mechanism will be the same.

The beams 16h, 17h are used for both downlink (UE Rx) and uplink (UE Tx). For a HO cell in 50AB, a pair of ping-pong PCIs 13A(1), 13A(2) are assigned to the two Tx RF paths and delivered to the same cell 51h by the same eNodeB. A different PCI is used when BHO happens, as UE would not HO to the cell with the same PCI. Hence each cell has two PCIs, say 1 and 4, so that there are different PCIs for each BHO. A cell can have PCI=1, then the HO beam would have PCI=4, then next beam HO would go back to PCI=1. Accordingly, a cell's PCI can be alternating as 1-4-1-4-1-4, and the ping-pong PCI design enables the eNodeBs and UEs to use 3GPP defined HO procedures for BHOs to solve satellite mobility issues.

The overlapping beam 17h from the rising satellite are almost the same as 16h but with different PCI. Initially, the different PCI for the overlapping beam 17h is there for the UE to do CFRA to the target beam from satellite 20B, commanded by the source beam 16h serving the UE. The BHO beams 16h and 17h are coming from the same eNodeB. Once the UE is synchronized with the new beam 17h, active UEs read the broadcast information and selects a suitable cell. The UEs use the system information block (SIB) to understand where and when the PRACH should happen. In addition, the source beam 16h sends RRC connection_reconfiguration, which commands the active UEs to measure the target beam with the PCI of the rising satellite 50B. RSRP and RSRQ of the target beam are measured and report back to eNodeB, so that eNodeB knows the condition is right for the BHO.

At the eNodeB 12(A) for cell 51h, the target satellite 20B delivers a new target HO beam 17h with another PCI, while Tx signals on source HO beam 16h provides UEs with target beam 17h PCI for the UE to measure, and accordingly UEs can sync with the target beam 17h. The Rx on the target beam provides the eNodeB with the Timing Advance (TA) values needed in CFRA Random Access Response (RAR). The source satellite Tx sends the target PCI 13A(2) to UEs for CFRA. Multiple cells' eNodeBs 12(A) may perform this in parallel for each of the HO cells 51h, sharing the HO tasks in the overlapping the overlapping area 50AB. BHO is on top of usual eNodeB scheduling and tasks, including UEs mobility, changing the beams and cells as needed when UEs move between them.

One Satellite Links to Two Gateway Sites (1S2G)

The 1S2G is the condition for GHO, as shown to the left-hand side of FIG. 2 when satellite 20A FoV has two or more GW footprint (GFP) and services are needed from both GFPs. To serve the cells 53 (dash lined cells), whose eNodeBs are on another gateway site 32, GHO starts when the first cell 53 in 50A requests for a service from satellite 20A and the second GW-SAT link 13 is needed. Accordingly, the 1S2G condition is needed for satellite 20A.

FIG. 5 further shows the GW links with each other, and the core network associated with GHO involving two GWSs, including a UE mobility case between cells 51 and 53 that are served by different GWSs shown in FIG. 2.

Operation

The eNodeB farms host thousands of cells with hundreds of eNodeBs serving corresponding cells fixed on the earth surface. The high speed of satellites means that some cells dynamically come into the satellite footprint while other cells are dynamically out of it. This means the satellite-serving GWS (i.e., the GWS that serves satellite) also changes the cluster of eNodeBs as the satellite moves, and eNodeBs are changing its GW-Sat link. To meet such dynamic cell change challenges, in some cases, the eNodeB software runs on an eNodeB's farm hardware, may need to float to another hardware (HW) which is a few hundred km away (in GWS diversity design), which involves an eNodeB mirrored image quickly when the GWS and its eNodeB farm hardware is the best configuration (or suitable configuration) for the software to carry on serving the cell. For example, in GWS diversity design, two GWS can be a few hundreds km apart, and the redundant site can quickly involve mirroring the GWS in action, so as to improve the user experience. Any fixed cell can be served by any eNodeB hardware in any GWS location while keeping the software's context for the fixed cell running on different hosts, which is referred to here as eNodeB mirroring. In some example, eNodeB hardware for servicing fixed cell can be changed from a first eNodeB hardware to a second eNodeB hardware, so the software's context is moved from the first eNodeB hardware to the second eNodeB hardware. The core network would need to have corresponding changes to deliver paging and system information according to the serving eNB changes. This can be particularly useful in certain exceptional cases.

Another way of using GWS diversity without duplicating the eNB HW is to use long distance fronthaul fiber link between the GWS. This is a cheaper option but will need to count the fiber TRx latency which normally are fixed and stable once the fiber link is configured and working as expected.

Figure 3A:
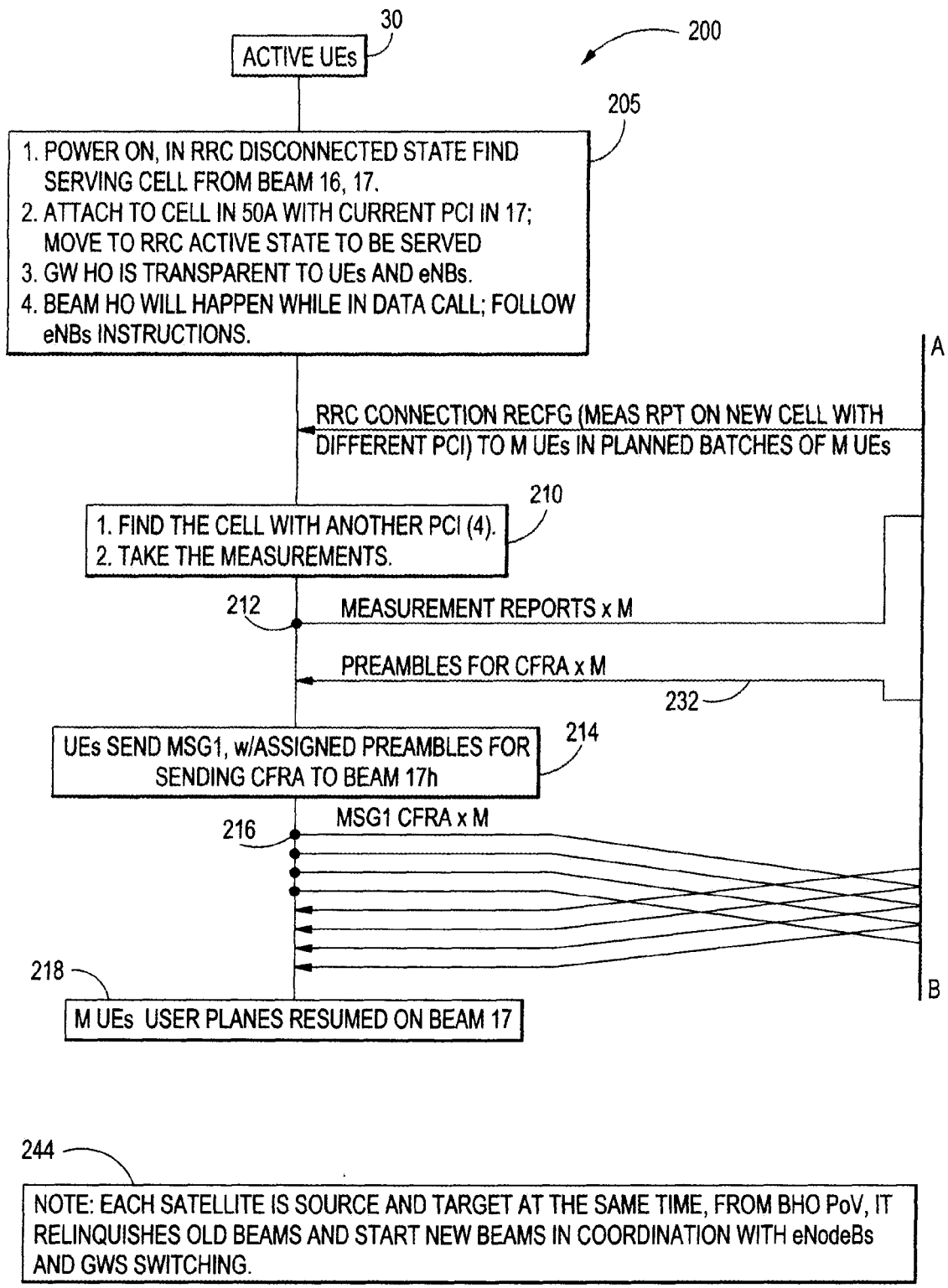
FIGS. 3(a), 3(b) and 3(c) are flow diagram of the BHO and GHO operation concept on the control plane of the system.
Figure 3B:
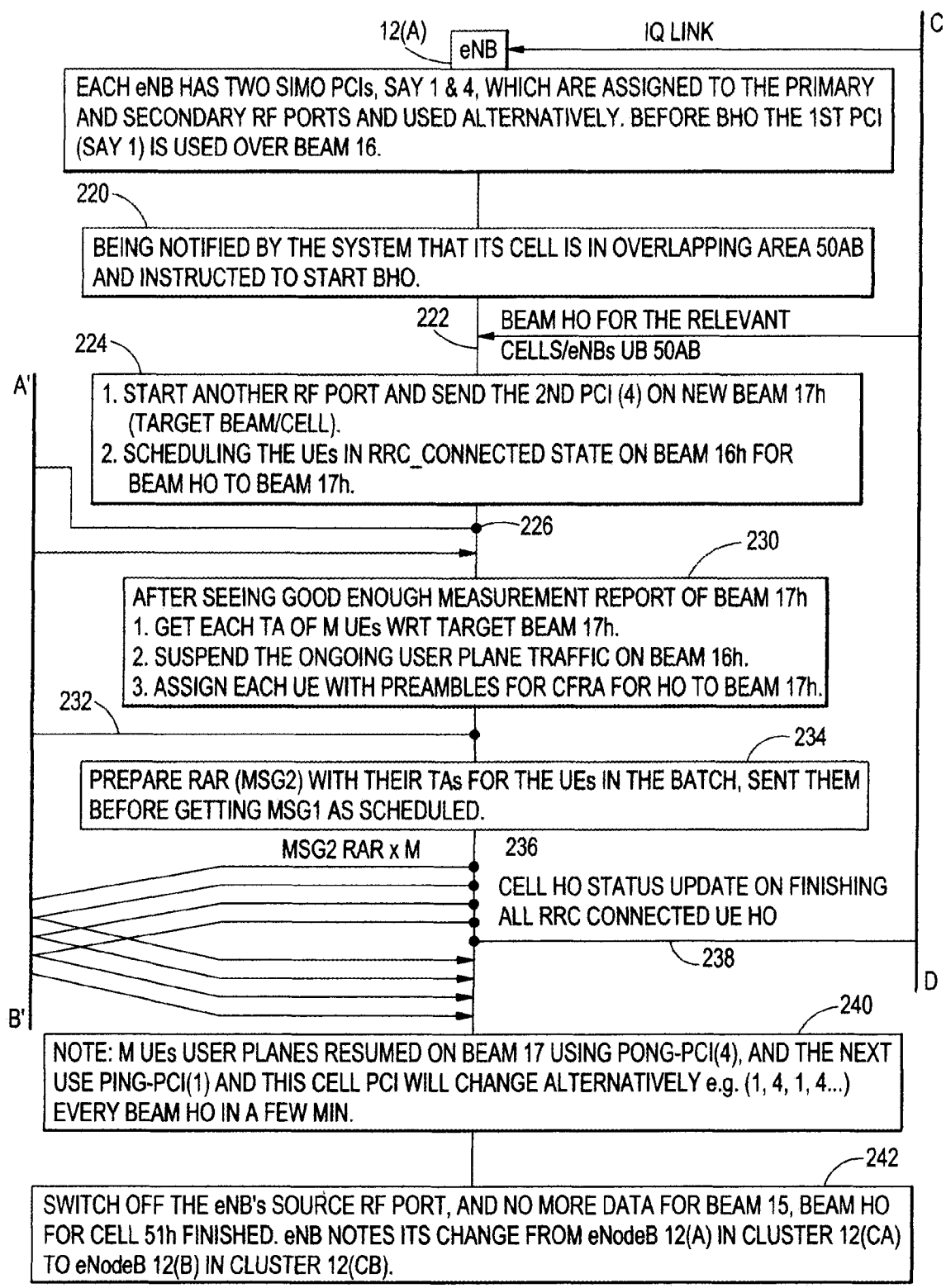
Figure 3C:
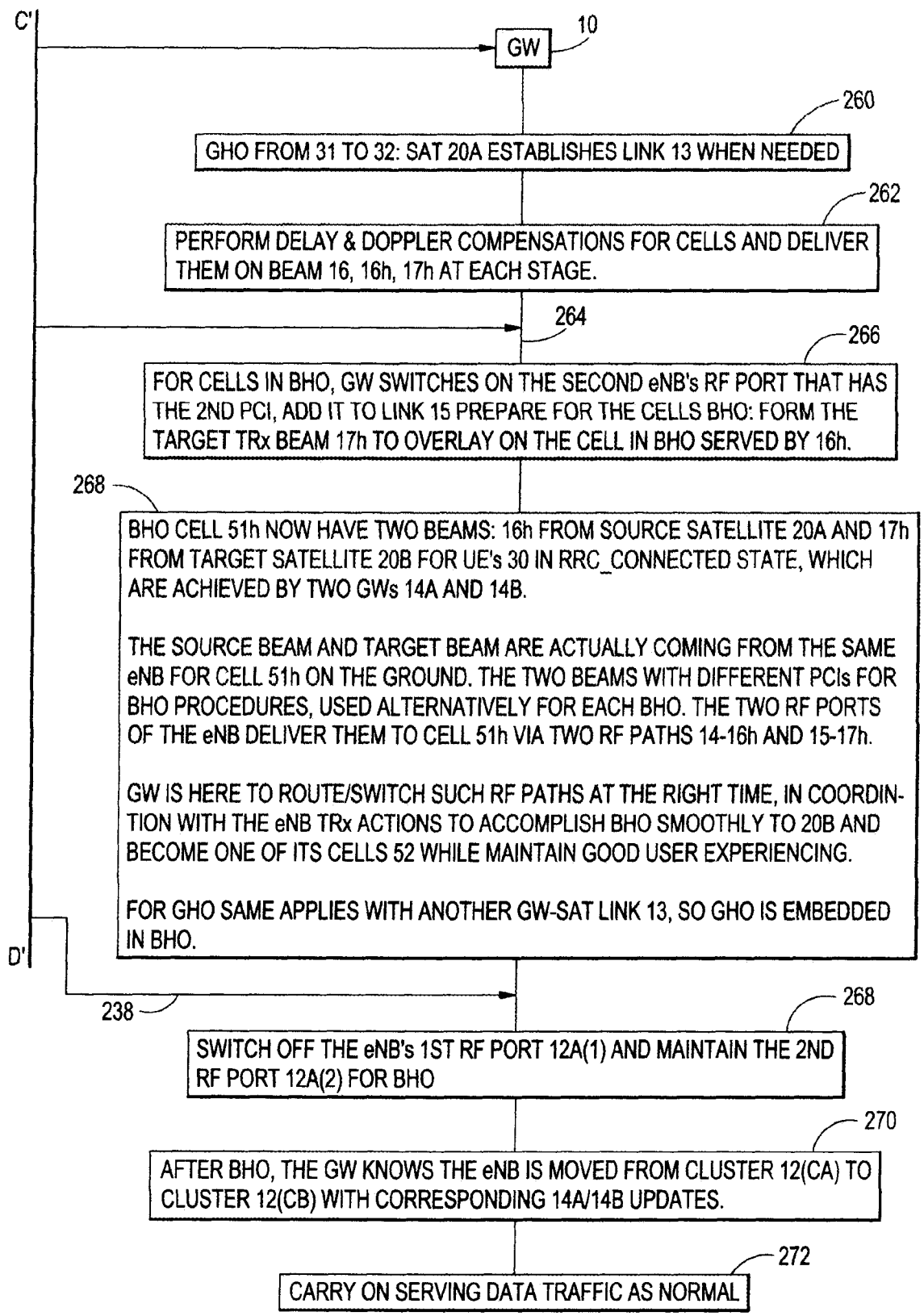

Turning to FIGS. 3(a), 3(b) and 3(c), operation 200 of the system is shown, and specifically at the UEs 30, their serving eNodeB 12(A), and relevant serving gateway that includes gateway channel routing block 10. BHO begins in active cell served by an eNodeB 12(A), where the active UEs 30 get the services with IQ streaming of GW antenna 14A for DL and UL, and satellite 20A tracks all the cells like 51 in its FoV. That means GWs are in good working order, i.e., step 260, the gateways 10, on one or more or all GWSs, establish the connections to their eNodeBs and satellites. A GWS (such as 31, 32) knows or recognizes that the upcoming satellites and relevant GWs are ready for necessary links with any satellites at any time to fulfill GHO needs. This is pre-scheduled and related to the locations of GWSs and satellites paths. On step 262, GW (such as GW channel routing block 10) performs delay compensation (or delay normalization) and Doppler compensation for cells 51, 52, 53 so that the delay variations and Doppler effect caused by satellite 20A, 20B are no longer a factor for eNodeB to handle, i.e., compensates the Delay and the Doppler to the center of each cell to provide a near zero differential delay and Doppler, e.g., dynamically. The compensation is to the cell centers and at the cell edge the residual delay and Doppler effect are within UE pulling range, and acceptable for getting LTE services. In some examples, GW (such as GW 10) may be configured to perform the delay normalization so that at the cell center UE can have its Timing Advance (TA) equal a midpoint (i.e., mid-point) timing-advance (TA) value. That is, for example, at the cell center (e.g., beam center), UE can have its timing advance equal a midpoint timing-advance (TA) value that is a midpoint value of a range of TA value.

When the active cell enters the overlapping area 50AB at step 220, the satcom system tells (or instructs) the eNodeB to start the BHO. For example, the eNodeB may start the BHO, in response to receiving a start instruction signal sent from the satcom system when the active cell enters the overlapping area 50AB. Step 222 and 264 are the handshake signals and actions on eNodeB and GW for subframe by subframe coordination of switching the IQ streams to the right GW with right satellites.

At some time point, the cells 51 are in the overlapping area 50AB, that is, the overlapping area of the FoVs (or footprints) of two satellites 50A, 50B. The BHO is ON and the cell become a BHO cell 51h. BHO must happen in area 50AB. The process of moving all the active UEs from setting satellite beam 16 to the rising satellite beam 17 is started. At that time point, the gateway 10, and eNodeB 12 are told or notified at step 264, that beam handover is to begin with beam 16 changed to 16h and 17h as eNodeB now need to perform BHO functions. At steps 222, 266, the eNodeB 12(A) and gateway 10 switch on the $2^{nd}$ RF port 12A(2) of the eNodeB 12(A) for beam 17h while 16h keeps the same as 16, and start to take care of newly added beam 17h. With BHO from 20A to 20B finished, and both satellites (20A, 20B) orbiting over it, cell 51h is no longer part of the FoV 50A of the setting satellite 20A, but in the FoV 50B of the rising satellite 20B. Accordingly, 51h is a newly added cell under the rising satellite 20B, and becomes a cell like 52 under satellite 20B's service, and beam 17h is changed to beam 17.

The BHO procedure is described below. Deliver the target TRx beam 17h to the beam HO cells 51h. The GWS 31 takes intermediate-frequency (IF) signal of the extra RF port 12A(2) and maps it to the GW-SAT link 15 for satellite 20B to provide new beam 17h to overlay it on cell 51h. The cell 51h (in the overlapping area 50AB of both satellites 20A, 20B) has two beams 16h, 17h, one from the source satellite 20A and one from the target satellite 20B, for active UEs (in RRC_connected state) to know the target beam 17h on BHO procedure starting from eNodeB (command or Step 226). The RRC has three states, idle, disconnected, and connected. When it is connected it essentially means a connectivity between eNodeB and UE has been established and ready to serve the UE. If the UE has no further service needs for a period of time, the inactivity timer expires and the UE will go into idle state, so does eNodeB service reservation of the radio resources (RRs) for the UE (as that radio resource will be allocated to other active UEs).

The source beam 16h and target beam 17h are overlaid on to the same physical cell 51h, fixed on the ground, with two different PCIs 13A(1) and 13A(2), respectively. Therefore, UEs 30 in cell 51h can recognize beams 16h and 17h as corresponding to two different cells, and satellites BHO can be realized by using the PCIs alternatively. The eNodeB's two RF ports 12A(1), 12A(2) deliver the ping-pong PCIs to the cell 51h via two RF paths 16h, 17h from two satellites 20A, 20B.

The gateway 10 routes or switches such RF paths at the right time between step 260 to 266, in coordination with the eNodeB. With TRx actions on step 224, the satellites BHO is started smoothly, and good user experience is maintained by steps in FIG. 3 under eNodeB's control. In some examples, TRx actions on step 224 may include transmitting the new PCI, and receiving UEs' responses for the BHO scheduling. When UEs are completely HO-ed to beam 17h, the BHO is finished, and the UEs are under satellite 20B's service or in one of the cells under satellite 20B's service, the serving beam is one of the beam 17. The BBU is still the same one for the same CBW, but can also be different one for a different CBW (e.g., in terms of hardware) in the GWS 31, but is changed from cluster 12(CA) to cluster 12(CB) conceptually, and accordingly the eNodeB (or its labeling) is changed from eNodeB 12(A) to eNodeB 12(B). The satellite is now changed from satellite 20A to satellite 20B before overlapping region moves forward leaving cell 51h and becomes one of the cells 52. All the cells in 50AB go through this BHO procedures in parallel with their serving eNodeBs, and there are many seconds to do that (should have enough time by design of satellites constellation).

Also, in FIG. 3, the eNodeB 12(A) starts as a source eNodeB and with PCIs preparation, and handover begins at step 222. Further, at step 224, the eNodeB 12(A) uses the source cell PCI 13A(1) (with, e.g., value of 1) on one RF port 12A(1), gets another RF port 12A(2) ready and send another PCI 13A(2).

On active UEs 30 side, the UEs 30 start their services just like UEs in TN cells. Step 205 shows the general starting point on UEs for BHO and GHO. eNodeB at step 226 starts scheduling the UEs in RRC_connected state as step 210 shows, telling or instructing the UE to find the target beam PCI 13A(2) and report the measurement for BHO.

The multiple (M) UEs further send their measurement reports 212 (M Multiple UEs can be scheduled for efficiency). The BHO eNodeB 12(A) in cluster 12(CA) receives the measurement reports and know beam 17h satisfy the HO condition and is in good position to take over. At the same time, UL signals 212 (e.g., measurement reports) enable the eNodeB 12(A), in step 230, to get the new RF path TA of each of M UEs in the batch with respect to (WRT) beam 17h. The eNodeB 12(A) then suspends the ongoing user plane traffic on beam 16h and assigns them with preambles for contention free random access (CFRA) for BHO. The BHO eNodeBs then send preambles for CFRA×M, to the M UEs 30, at step 232, so that CFRAs can happen to beam 17h and eNodeB knows or recognize each UE by the assigned preambles. At step 234, the BHO eNodeBs 12(A) also prepares RAR with the correct TA for every UEs in the batch, send them before getting MSG1 as scheduled on 236. The way to get BHO UEs' TAs of the handover beam 17h are based on their TAs of the setting satellite serving beam. The two beams are both processed by the same eNB baseband signal processing unit which knows by UL grant commands to those UEs which RBs are for which UEs, by correlating the two received signals of the RBs, it is able to pre-calculate the new TAs for the rising satellite beam without waiting for their RACH with CFRA, and pre-emptively send the RAR (MSG2) to meet the UEs' expectation of the MSG2. If there is any new error of TA developed, the TA changes can be tracked from the MSG1s that will be received after MSG2. This is an important innovative addition to resolve the BHO speed, a challenge when many active UEs go through the BHO every few minutes.

At step 214, in response to signal 232, the UEs 30 send MSG1 that includes the CFRA to beam 17h for PRACH (e.g., the spec defined procedure) and to notify the eNodeB 12(A) that the UE 30 is going to move from source HO beam 16h to target HO beam 17h. Preambles are used or included to help beam 17h to identify and distinguish between the UEs 30. Thus, the UEs 30 send MSG1 CFRA×M to the eNodeB 12(A) in cluster 12(CA), at step 216. Further, the eNodeB 12(A) in cluster 12(CA) sends MSG2 RAR×M to the UEs 30, at step 236.

In response to MSG2, the M UEs 30 knows or identifies the new TA to use with the beam 17, and user planes (i.e., data traffic) are resumed, at step 218. And in response to MSG1, at step 240, M UEs User planes (with the BHO eNodeB 12(A)) are resumed on PCI 13A(2) (value of 4), and the next BHO will use PCI 13A(1) (value of 1), and this cell PCI will change periodically e.g. [1,4,1,4 . . . ] every few minutes when the next rising satellite take the services.

In addition, at step 238, the eNodeB 12(A) sends cell HO status update on finishing all RRC_connected UE HO to the gateway 10. The gateway 10 then switches off the eNodeB's RF port 12A(1) with PCI 13A(1) for BHO, and uses RF port 12A(2) and PCI 13A(2) for ongoing user plane under the service of satellite 20B. The coexisting beams 16h and 17h from two RF ports 12A(1) and 12A(2) via two GW antennas 14A, 14B and two satellites 20A and 20B improve the reliability of the BHO, and in case of the failed CFRA for some UEs, the above procedure can be repeated until all the scheduled CFRAs are handled successfully. From step 238, via control channel in the eNodeBs and GWS interface, the BBUs that are behind the two overlapping beams know that all active UEs are HO to new beam 17h/17, and no need to have the old beam 16/16h and take them off in step 268. The eNodeB also stops sending signals via the older port. This ends the BHO and the BHO eNodeB is now registered itself as eNodeB 12(B) in cluster 12(CB) in step 242 and 270 on eNodeB farm and GWS, back to user plane traffic data handling as usual via satellite 20B in step 272. In some examples, the eNodeB may end the BHO in response to receiving an end instruction signal sent from the satcom system.

It is worth mentioning that each LEO satellite can, depending on where they start from an initialization together with its serving GWs and eNodeBs, provide the services for cells in its FoV. As a LEO satellite it always has constant relative move with the cells being served, hence it is not only steering the beams for tracking the existing cells all the time, but also doing the BHOs with neighbor satellites as cells are coming into its FoV as well as leaving from it constantly. Step 244 of FIG. 3 notes the overall ongoing procedures in handling the satellite-cell dynamics. Each satellite is source and target at the same time, from BHO point-of-view (PoV), and relinquishes old beams and start new beams in coordination with eNodeBs and GWS switching.

GWe10 for 18 Equatorial Se20 at 700 km LEO

Figure 4A:
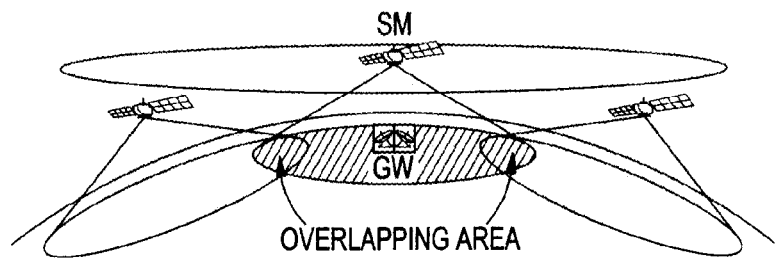
FIG. 4(a) is a diagram of 1G1S or 1S1G (1 Gateway that has link with only 1 Satellite).
Figure 4B:
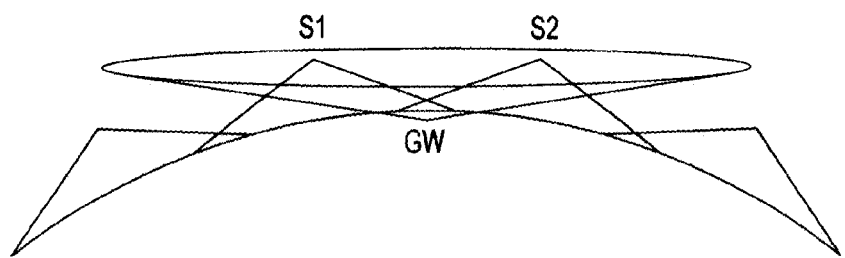
FIG. 4(b) is a diagram of 1G2S or 2S1G.
Figure 4C:
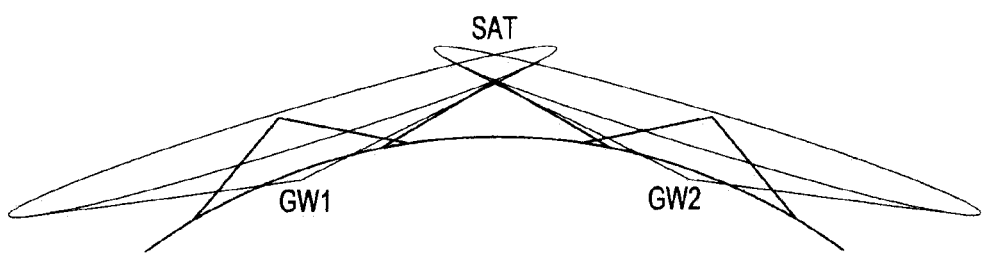
FIG. 4(c) is a diagram of 2G1S or 1S2G.

Referring to FIGS. 4(a), 4(b), 4(c), just enough density of GWSs and satellites is desirable. Then for BHO and GHO, 3 cases are considered here as non-limiting illustrative examples of the present disclosure. FIG. 4(a) represents the 1G1S (one gateway, one satellite) scenario. In this case, one satellite can only connect to one gateway. FIG. 4(b) represents 1G2S cases where two satellites can be connected to one gateway station simultaneously.

In FIG. 4(c), 2G1S is shown, where two gateways connect to one satellite in order to have gateway HO (GHO), for example where a satellite flies through a big county. The eNodeB farm is either located in each gateway or in a datacenter between gateways, which enable GWS diversity to deal with rain or other situations. To achieve this, both GWSs of both GWs (or both GWs) are connected via high bandwidth CPRI or eCPRI fibber link (the fronthaul) to pass the IQ data for DL and UL of hundreds of cells for both Gateways whichever is needed by two GWSs. Otherwise the cells in between the two GWSs will have to have duplicated eNodeBs on both GW sites to serve those cells.

The satellite overlapping areas need the action alignment of active UEs, BHO beams, satellite, GWS, eNodeB, BHO scheduling, different eNodeBs in rising satellite and GWS with inter GWS eNodeB Gateway Interconnectivity Link (such as X2) passing UEs TA for the target cell, on top of arranging the CU and DU rerouting. The inter GWS 10-15 ms Gateway Interconnectivity Link (GIL) delay is considered as part of delay normalization, as pre-scheduling is done, and UE can recognize the new DL frame. The system compensates the main time delay, while the TA handles the residual part that is related to UE location in a cell. X2 is commonly used on LTE, and is used here as an example of GIL. GIL enables the communication between gateways and supports handover cases.

FIG. 4(b) shows the 1G2S case, where satellite beams HO while keeping the same GWS as shown in, e.g., FIG. 2. The HO scheme introduces two simple information elements (IEs) in Gateway Interconnectivity Link eNodeB link for UE HO procedure, in order to enable UE mobility HO needs by standard 3GPP procedures. The two key modifications are: ping-pong PCIs for the two RF ports of the cell eNodeB.

The embodiments (or examples) of the BHO of the present disclosure include that, by faking the PCIs, the BHO is turned into a standard UE HO event for each UE, so that a normal UE does not need to take care of which satellites and gateway is serving it, nor does the eNodeB. This procedure significantly simplified the sat RAN requirement to UEs and base stations, making the satellite complexity transparent (e.g., completely transparent) to both of the RAN parties which turn every normal phone into the sat phones or satphones (e.g., satellite phones that can communicate with satellites), and transparent satellites are enabled and directly communicate with a modified base-station low PHY (i.e., physical layer) and un-modified standard 3GPP compliant UEs. In some examples, base station is configured to implement functions to work with sat RAN. Since it is not changing the cell as a matter of fact, the core network does not need to divert any dataflow and no real cell HO really happen, and no extra load for the system.

It is worth mentioning that such change may be treated as handover between two cells from the first look of system architecture, it can be done using two RF ports of one cell itself without extra hardware. By default, 2 RF ports are available for each cell, the MIMO operation for the UEs that go through BHO can be suspended for a few frames for its BHO, then resume its MIMO after BHO.

The above functions described are the SW modifications needed on the base station (BTS for 2G, eNB for 4G and gNB for 5G). In addition to the BHO procedure related SW changes, there are some generic sat RAN SW changes. A brief summary of the major baseline changes for BHO are:

1. since the RF path on feeder link and service link are over 1000 km, there will be extra delay, on DL and UL signal, that we normalize to particular value, on delay function mentioned earlier. This impacts the base station Rx but would be known in the system configuration, so sat RAN base station Rx scheduling will be modified with such a delay.
2. for time sensitive procedure, like PRACH for LTE, try to use CFRA as much as possible (see the description in this disclosure), and CBRA are used for the initial random access and need a set of pre-emptive MSG2 with good probability of meeting the needs of the UE is employed, that include the use of limited preambles for CBRA and estimating the TA by previously sent PRACHs; For 2G this will just need to adjust the Rx time.
3. System configuration with timer that sensitive to the long round trip time (RTT) all needs to be changed so that they would tolerate more RTT.
4. CN changes for accommodating the two cells for one geographical cell, and assign two sets of same parameters them accepting two PCIs, and avoid redirecting the user data when there is no real change of the BBU. CN understand the fact that there is an additional fack cell for each real cell.

FIGS. 4a, 4b, 4c show the cases of system implemented in 1G1S, 1G2S, and 2G1S, respectively. They are suited for different cases. However, the information between gateways flows through the GIL, not through the satellite as there is no inter-satellite relay that may violate the data security law and regulation of the region. In an example 1G1S period or case of FIG. 4(a), no beam HO is needed. For example, when a Satellite FoV is much larger than the region needs to be served and 1S can cover the region completely. As a more specific example, an island country like UK and Japan can be covered by one satellite FoV at certain period of time. However when the region is near the FoV edge, then 1G2S in FIG. 4(b) may be needed, as BHO is needed to continue the service. 1S1G will terminate and transition to 1G2S when the FoV edge come close to the area it covers, as another satellite needs to take over the cells on this edge. FIG. 4(c) illustrates the case of the next moment or another case. A satellite also needs to cover new cells in its FoV as the satellite fly over them. The GWS that hosts the new cells needs 1S2G to fulfill the extra service. So 1G1S is temporary and will be, for example, followed by 1G2S and 1S2G.

Backhauling

Figure 5A:
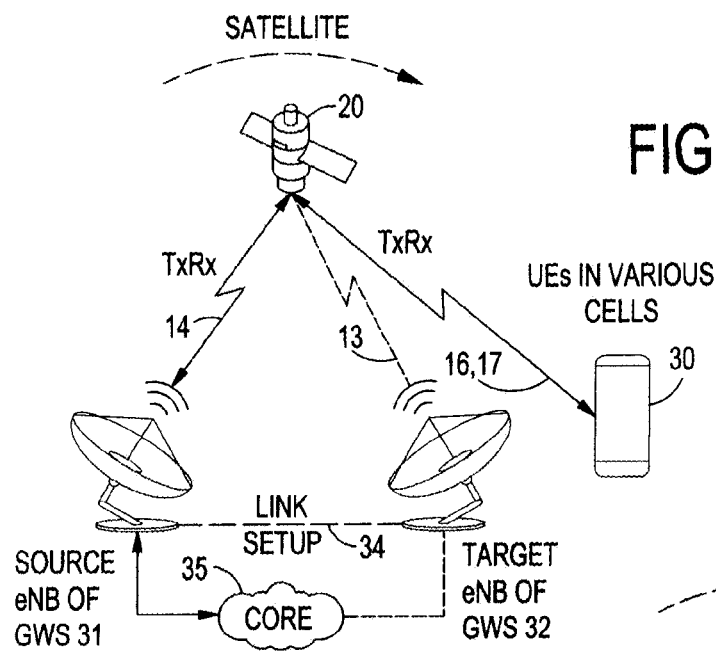
FIGS. 5(a), 5(b), 5(c) are block diagrams showing Gateways interconnectivity link for a UE mobility case.
Figure 5B:
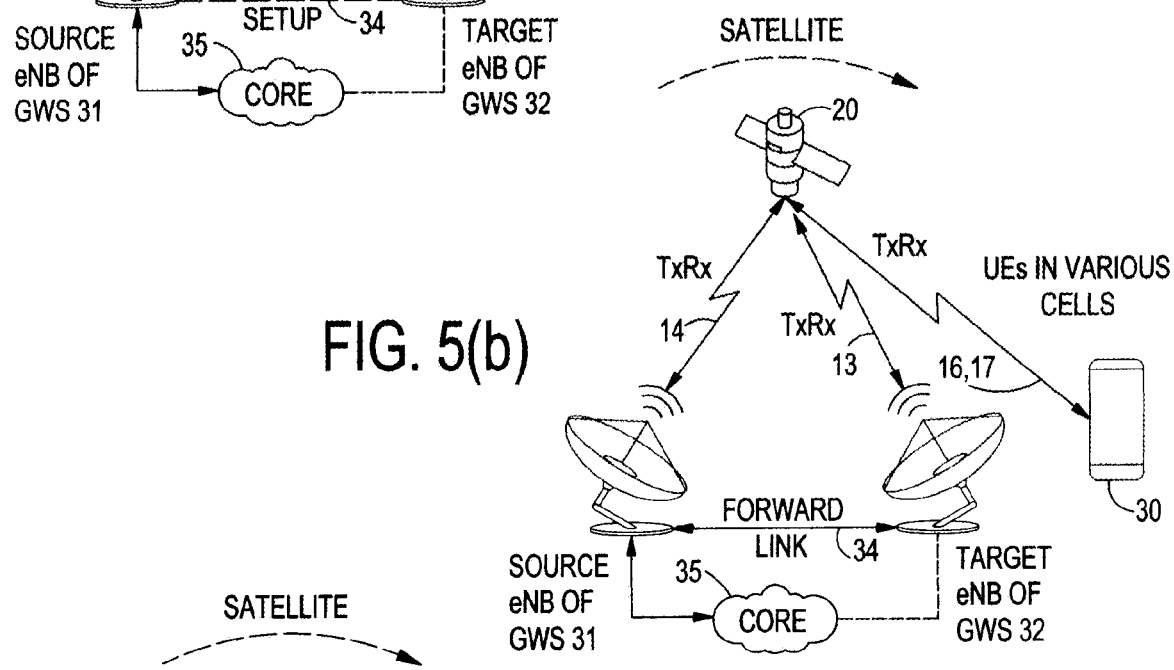
Figure 5C:
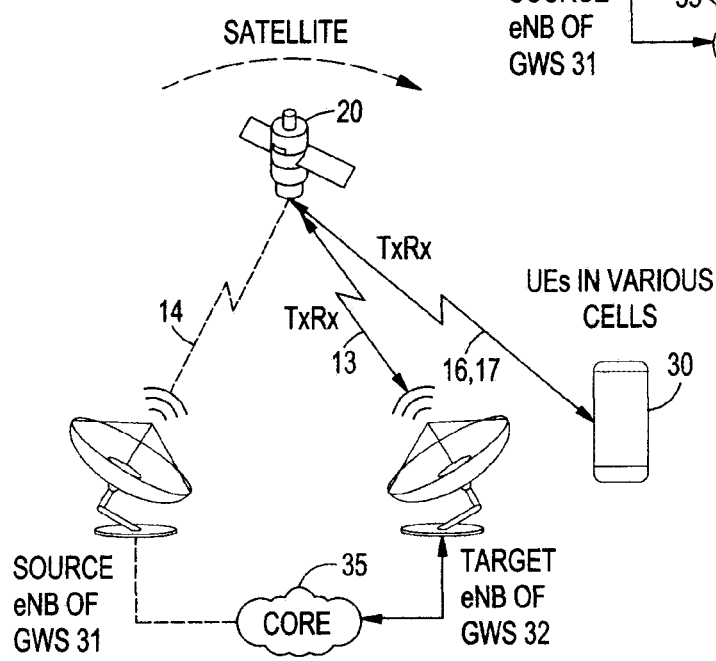

Referring to FIGS. 5(a), 5(b), 5(c), Gateway Interconnectivity Link backhauling is shown, where Gateway Interconnectivity Link (e.g., inter-gateway link) is a type of interface introduced by the LTE Radio Access Network. Here, backhauling refers to connectivity to the core network, basically where the traffic from/to the UE goes/come. GIL connects neighboring eNodeBs in a peer to peer fashion to assist UE mobility handover (the traditional TN cell HO due to UE moving across cells) and provide a means for rapid co-ordination of radio resources. The Gateway Interconnectivity Link does not require a dedicated physical connection between eNodeBs. It is a logical interface that can pass over the existing IP transport network. The Gateway Interconnectivity Link does not require L3 Routing. Where possible, switching can be used and is preferable for the higher performance achieved.

The Gateway Interconnectivity Link interfaces are not needed between ALL eNodeBs in a TN (Terrestrial Network), NTN beam HO needs the Gateway Interconnectivity Link for neighbor GWSs' eNodeB Gateway Interconnectivity Link for passing target UEs info. Clarification for the Gateway Interconnectivity Link between eNodeB farms is needed and started.

The Gateway Interconnectivity Link interfaces are only needed between neighboring eNodeBs (i.e. those that control cells with overlapping coverage areas in 1G2S+1G1S+1G2S case). It is only between neighbors that handovers will occur, or interference co-ordination will be needed.

FIGS. 5(a), 5(b), 5(c) show a case of UE mobility handling between two cells served by one satellite however the source cell and target cell are served by two gateways respectively. The Core Network 35 needs to handle the user data flow from source eNB of the GWS 31 to the target eNB of the GWS 32 in such active UE cell handover.

In some examples, gateway site handover is done or performed on cell granularity, and a cell is associated with a GWS, as the satellite moves from one gateway coverage area (or one gateway-site coverage area) to another during orbiting. Satellites may transfer (or switch) communications from the source satellite 20A to the target satellite 20B in 1G2S conditions (see FIG. 2), and/or transfer communications from gateway antenna 14A of gateway site 31 to gateway antenna 11B of gateway site 32 for satellite 20A in 1S2G condition where gateway antennas 11B and 14A belong to two GWSs 32, 31, respectively. Hence the GHO is embedded in BHO, and Soft HO is applied to BHO; and GHO, on the granularity of UE, takes a much longer time (many seconds), as it involves seamless HO of each active UE, one by one under eNBs control, for each cell running in parallel. The GHO is a function of satellite, and when a satellite (such as 20A of FIG. 2) orbits over a GWS, another GWS will serve it, which has to happen gradually and happens naturally with many BHOs.

That is to say that the GHO is at the granularity of BHO. When all the beams from one GWS is moved from a satellite (such as 20A of FIG. 2) to another satellite (such as 20B of FIG. 2), the satellite (such as 20A) can have the resource availability to take new cells below to another GWS (such as 32). BHO and GHO are both "make before break" for each active UE. eNodeB would switch off 16h only when 17h has taken over, and more importantly BHO does not change eNB for the cell, so all the active UEs context are kept and seamlessly take effect as needed making 17h to 17 transition super smooth, as it is the same eNB before and after BHO (e.g., BHO shown in FIG. 2).

The satellite has a footprint which has the front edge and back edge. BHO happens at the two semi-circle edge. The front edge of the satellite may take new cells, as another satellite in front of the satellite HOs the cells to the satellite. The back edge of the satellite may relinquish cells, as the satellite HOs those cells to another sat behind it. The edges are defined by the elevation angle >=20 degrees in general but can be stretch to cover cells with a lower elevation angle when necessary.

In some examples, GWS also has a footprint, which may be smaller or much smaller than its FoV. FoV of a GWS means the area that the GWS can cover or reach. But an operator may normally choose or configure to cover some portions of the FoV, rather than all portions of the FoV (although it can), so as to save cost. The area that the operator assigns eNB of GWS to cover or reach in the FoV is called footprint, which is the area that the GWS not only can reach, but also have its "foot" on.

One of the GHO process is for UE mobility as mentioned, from cell 51 to cell 53 as shown in FIG. 2. It has three phases: preparation (FIG. 5(*a*)), execution (FIG. 5(*b*)), and completion (FIG. 5(*c*)). During the preparation phase (FIG. 5(*a*)), the UE 30 is connected to the source eNodeB in GWS 31 and from there to the core network 35 (e.g., the core is formed by multiple nodes, which offer multiple functionality such as mobility management, authentication, session management, setting up bearers and application of different Quality of Services). At some point, when UE moves to cell 53 whose target eNodeB is in GWS 32, the eNodeB receives a handover notification of beam HO. During the execution phase (FIG. 5(*b*)), the UE 30 is connected to the target eNodeB in GWS 32 but the traffic is routed via the gateway interconnection link (forward link) 34 to the source GWS 31 and then the core 35. Finally, at the completion phase (FIG. 5(*c*)), the UE 30 is connected to the target GWS eNodeB 32 and from there to the core 35. Thus, communication between the satellite 20 and the core 35 is originally through the eNodeB in GWS 31 at the source gateway site, and transferred to the eNodeB in GWS 32 at the target gateway site.

In the embodiments shown, the gateway (or the gateway site) can include a processing device to perform various functions and operations in accordance with the invention, such as the eNodeB 12. The processing device can be, for instance, a computing device such as a computer, processor, application specific integrated circuits (ASIC), or controller. The processing device can be provided with one or more of a wide variety of components or subsystems including, for example, wired or wireless communication links, and/or storage device(s) such as analog or digital memory or a database. All or parts of the system, processes, and/or data utilized in the invention can be stored on or read from the storage device. The processing device can execute software that can be stored on the storage device. Unless indicated otherwise, the process is preferably implemented in automatically by the processor substantially in real time without delay. The system and method of the present disclosure can be implemented using standard UEs by computer software that accesses data from an electronic information source. A medium also includes one or more non-transitory physical media that together store the contents described as being stored thereon.

In some examples, in the satellite communication system of present disclosure, one to one mapping of the base station with its serving cell is kept via tracking of fixed cells while satellite passes them dynamically at high speed (7-8 km/s). In certain examples, in the satellite communication system of present disclosure, gateway placement is such that the satellites serving cells of the gateways have the line of sight (LOS) to the gateways for smooth GW HO.

In one example, the satellite communication system is configured to mirror and cause base-station software to be transparent to UE, embedded GW HO, GW/base-station (BTS, eNodeB, gNodeB) core network proper support on tracking area code, paging and system information X2 links, including the phases and timing changes due to GWS changes to meet 3GPP specs, where the phases and timing may refer to (or is related to or corresponds to) a long delay caused by the feeder links and service links. Those are to be adjusted or configured to make the system working and be able to work with unmodified UEs. In certain examples, core network proper support may refer to or include the eNB modifications and PCI assignment changes; and phases and timing may refer to the long delay caused by the feeder links and service links. Those can be adjusted to make the system work with unmodified UEs.

In some examples, base station is adapted to support a configurable fixed round trip latency, set various timer accordingly related to a long RF path delay.

In certain examples, the beam handover on the active UEs uses standard UE HO procedures to achieve synchronised seamless handover, one by one; without UEs and base-stations handling which satellite and which gateway are their serving entities, a function that is taken care of by the satellite network control centre. The gateway handover on the cell-by-cell basis may be achieved via many beam handovers over the orbiting course.

In certain examples, in the satellite communication system of present disclosure, multiple gateways are linked by long distant fronthaul optic fibbers, far more than those used in terrestrial network, such as a few hundred km to over one thousand of km, to enable gateway sites handover as well as GWS diversity and the coverage efficiency.

In the present disclosure, a LEO satellite communication system, turning legacy normal UEs to satphone resolving the satellite mobility by reusing UE handover procedures to resolve one of the most challenging issue in sat RAN, is in communication with a first setting satellite having a first field of view including a first plurality of cells, and a second rising satellite having a second field of view including a second plurality of cells. The first and second satellites have an overlapping field of view having an overlapping plurality of cells located therein. A first processing device has a first communication port communicating with a first cell of the first plurality of cells via said first antenna over a first beam, and a second communication port communicating with an overlapping cell of the overlapping plurality of cells via said second antenna over a second beam. Said first processing device switches from said first communication port to said second communication port in response to the first cell of the first plurality of cells moving into the overlapping field of view.

Accordingly, as disclosed above, a satellite communication handover system is in communication with a first setting satellite having a first field of view including a first plurality of cells in which an active User Equipment (UE) is located that is in direct communication with the first setting satellite, and a second rising satellite having a second field of view, the first and second satellites having an overlapping field of view where the first field of view overlaps with the second field of view, and an overlapping plurality of cells located in the overlapping field of view. The satellite communication handover system has a first feeder link and a first tracking antenna configured to communicate with the active UEs via a first setting satellite directly serving the first plurality of cells and a second feeder link and a second tracking antenna configured to communicate with the second rising satellite serving the active UEs directly in the second plurality of cells. The system also has a processing device configured to communicate with the active UEs to control the active UEs to communicate directly with the second rising satellite.

The processing device can also be configured to start or end beam handover in response to an instruction signal from the first setting satellite and the second rising satellite. The active UE communicates directly with the first setting satellite over a first service link beam, and the active UE communicates directly with the second rising satellite over a second service link beam. The first antenna communicates with the first setting satellite over a first feeder link beam, and the second antenna communicates with the second rising satellite over a second feeder link beam. The processing device is further configured to control the active UE to cease communicating with the first setting satellite. The first antenna stops communicating with the first setting satellite. The processing device is configured to communicate with the active UE with a first physical cell ID (PCI) and via the first setting satellite, and communicate with the active UE with a second PCI and via the second rising satellite, when the active UE becomes in the overlapping field of view.

The satellite communication handover system determines the TA for each active UE, needed for the BHO destination beam of the rising satellite, by two feeder links and overlapping service links received signals of each UE's uplink RB receiving time correlations, before getting the UEs CFRA in the destination beam and achieve the efficiency of many active UEs BHO. The system has application in 2G, 4G and 5G without any modification to legacy UEs, and the CFRA (MSG1) is used for further TA tracking when needed in the target beam. The first setting satellite and the second rising satellite are transparent and directly communicate with a modified base-station low PHY and un-modified standard 3GPP compliant UEs.

Smart satellites layer 0 relay with large phase arrays that form electronically steerable beams for tracking many cells on the ground. One to one mapping of the base station with its serving cell is kept via tracking of fixed cells while satellite passes the fixed cells dynamically at high speed (7-8 km/s). Gateway placement is such that the satellites serving cells of gateways have the LOS to the gateways for smooth GW HO. A gateway is configured to perform delay normalization and Doppler compensation to the center of each cell dynamically. The gateway can be configured to perform the delay normalization so that a UE at a cell center has its timing advance (TA) equal a midpoint TA value. The system is adapted to support a configurable fixed round trip latency, set various timer accordingly related to a long RF path delay. The system performs seamless beam handover with two physical cell identities (PCIs) assigned to two radio-frequency (RF) ports that serve as the first and second communication ports or cells respectively, generates two radio-frequency (RF) downlink signals, each carrying one of the two PCIs assigned, and forms two beams and overlay the two beams on an overlapping cell of for beam or cell handover, via the first setting satellite and the second rising satellite.

Two PCIs are selected in such a way similar to neighbor cell PCI deployment, so that they are orthogonal to each other, to avoid interference, and MIMO principles apply so that the two overlapping handover beams work together without interfere with each other. The beam handover on the active UEs uses standard UE HO procedures to achieve synchronized seamless handover, one by one; without UEs and base stations handling which satellite and which gateway are their serving entities, a function that is taken care of by the satellite network control centre. And to perform a hard BHO for an idle cell without any active UEs, wherein the same beam/PCI/RF port is shifted from one feeder link to another for serving the same idle cell, without changing the PCI. Gateway handover is on the cell-by-cell basis is achieved via multiple beam handovers over an orbiting course.

The satellite communication handover system is mirroring base station software to be transparent to the active UE, embedded GW HO, GW/base station core network proper support on tracking area code, paging and system information X2 links, including the phases and timing changes due to GWS changes to meet 3GPP specs. An inter-gateway link supports the active UE mobilities for both voice and data calls. Multiple gateways are linked by long distant fronthaul optic fibbers, far more than those used in terrestrial network, from a few hundreds km to over one thousand km, to enable gateway sites handover as well as GWS diversity and the coverage efficiency. The system relays the 3GPP downlink and uplink signal between base stations and user equipment and turn normal phones to satellite phone without any modifications and reaching normal UEs on global scale. And, provides 3GPP RAN coverage to a remote place that is not covered by a constellation of LEO satellites without a huge cost of building the ground based infrastructure.

Changes to base station are according to satellite RAN's new feature requirement by reusing 3GPP specs to enable satellite RAN without UE and base station managing satellites and gateway connections. The satellite RAN system makes the satellite and gateway management totally transparent to them, and let them perform the RAN function with modifications on base station. The satellite communication handover system achieves BHO for serving the normal active UEs by standard 3GPP HO process without any modification on the active UEs. The base station is modified to have alternative cell IDs in supporting beam handover (BHO). The two cell IDs are used alternatively, with core network support on corresponding changes. The base station is modified such that BHO starts from network side, either by changing the two beams RF level, or NW initiated UE HO. And, LEO sat RAN beam handover is turned to standard UE mobility handover by faking a phantom cell to every geographical sat RAN cell; and assigning two PCIs to each sat RAN cell for the BHO that does not interfere with each other; and making the active UEs believe there is another cell, so that the BHO is streamlined and the active UEs are naturally changing their serving beams.

The satellite communication handover system has a long distance fronthaul that uses fiber link to enable gateway site diversity and enlarge gateway FoV and footprint. The fiber latency is encapsulated into the delay compensation, which can support fronthaul far longer than normal terrestrial network fronthaul, in a range of a few hundred km to over a thousand km. The satellite communication handover system can use standard HO mechanism to achieve satellite beam handover. The system handles the satellite mobility by a way that is compatible with a standard UE handover mobility procedure and using the standard UE mobility handover procedure for sat RAN beam handover (BHO) due to satellite mobility. The base station includes at least one of BTS, eNodeB, or gNodeB.

It is further noted that the system and method of the present disclosure can be used in a large phased array, such as for example as disclosed in U.S. Pat. Nos. 10,979,133 and 11,121,764, the entire content of which is hereby incorporated by reference.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A satellite communication handover system configured for communication with a first setting satellite having a first field of view including a first plurality of cells in which an active User Equipment (UE) is located that is in direct communication with the first setting satellite, and also configured for communication with a second rising satellite having a second field of view, the first and second satellites having an overlapping field of view where the first field of view overlaps with the second field of view, and an overlapping plurality of cells located in the overlapping field of view, the overlapping plurality of cells including a cell in which the active UE is located, the satellite communication handover system comprising:

a first feeder link and a first tracking antenna configured to communicate with the active UE via the first setting satellite directly serving the first plurality of cells and a second feeder link and a second tracking antenna configured to communicate with the second rising satellite serving the active UE directly in the second plurality of cells;

a processing device configured to communicate with the active UE to control the active UE to communicate directly with the second rising satellite; and a gateway configured to perform delay normalization so that a UE at a cell center has its timing advance (TA) equal to a midpoint TA value.

2. The satellite communication handover system of claim 1, wherein the processing device is configured to start or end beam handover in response to an instruction signal from at least one of the first setting satellite and the second rising satellite.

3. The satellite communication handover system of claim 1, wherein:

the active UE is able to communicate directly with the first setting satellite over a first service link beam; and the active UE is able to communicate directly with the second rising satellite over a second service link beam.

4. The satellite communication handover system of claim 3, wherein:

the first antenna is configured to communicate with the first setting satellite over a first feeder link beam; and the second antenna is configured to communicate with the second rising satellite over a second feeder link beam.

5. The satellite communication handover system of claim 1, wherein the processing device is further configured to control the active UE to cease communicating with the first setting satellite.

6. The satellite communication handover system of claim 4, wherein the first antenna is configured to stop communicating with the first setting satellite.

7. The satellite communication handover system of claim 1, wherein the processing device is configured to:

communicate with the active UE with a first physical cell ID (PCI) and via the first setting satellite; and communicate with the active UE with a second PCI and via the second rising satellite, when the active UE becomes visible in the overlapping field of view.

8. The satellite communication handover system of claim 1, wherein the first feeder link and first tracking antenna are part of a base station, and wherein one to one mapping of the base station with a serving cell is kept via tracking of fixed cells while either the first or the second satellite passes the fixed cells dynamically at a speed of between 7-8 km/s.

9. The satellite communication handover system of claim 1, further comprising:

a gateway configured to perform delay normalization and Doppler compensation to the center of each cell dynamically.

10. The satellite communication handover system of claim 1, the first feeder link and the first tracking antenna being at a base station, the system being configured to:

perform seamless beam handover with two physical cell identities (PCIs) assigned to two radio-frequency (RF) ports that serve as first and second communication ports respectively, generate two radio-frequency (RF) downlink signals, each carrying one of the two PCIs assigned, and form two beams and overlay the two beams on an overlapping cell for beam or cell handover, via the first setting satellite and the second rising satellite, wherein:

two PCIs are selected so that they are orthogonal to each other, to avoid interference, and MIMO principles apply so that the two overlapping handover beams work together without interfering with each other; and the two PCIs are PCIs for the same or different cell bandwidth, so that beam handover with the same and different cell bandwidth are both supported.

11. The satellite communication handover system of claim 1, wherein the satellite communication handover system:

is configured to relay 3GPP downlink and uplink signal between the first feeder link and first tracking antenna; and is configured to provide 3GPP RAN coverage to a remote place that is not covered by a constellation of LEO satellites.

12. The satellite communication handover system of claim 1, wherein the satellite communication handover system achieves beam handover for serving the active UE by a 3GPP handover process without any modification on the active UE.

13. The satellite communication handover system of claim 1, wherein the first feeder link and the first tracking antenna are at a base station, and the base station includes at least one of a BTS, an eNodeB, or a gNodeB.

14. The satellite communication handover system of claim 1, further comprising the first settling satellite and the second rising satellite, wherein each of the first setting satellite and the second rising satellite has a large phase array that is configured to form at least one hundred electronically steerable beams in order to serve at least one hundred cells.

15. The satellite communication handover system of claim 1, wherein the satellite communication handover system is configured to perform delay and Doppler compensation for each beam to normalize delay to a constant amount.

16. The satellite communication handover system of claim 1, wherein the satellite communication handover system further includes a satellite network control center (NCC) that is configured to orchestrate communication operations of a base station, a ground gateway site, and the first and second satellites and wherein satellite radio access network (RAN) base station receive (Rx) scheduling is modifiable with a delay.

17. A satellite communication handover system configured for communication with a first setting satellite having a first field of view including a first plurality of cells in which an active User Equipment (UE) is located that is in direct communication with the first setting satellite, and also configured for communication with a second rising satellite having a second field of view, the first and second satellites having an overlapping field of view where the first field of view overlaps with the second field of view, and an overlapping plurality of cells located in the overlapping field of view, the overlapping plurality of cells including a cell in which the active UE is located, the satellite communication handover system comprising:
 a first feeder link and a first tracking antenna configured to communicate with the active UE via the first setting satellite directly serving the first plurality of cells and a second feeder link and a second tracking antenna configured to communicate with the second rising satellite serving the active UE directly in the second plurality of cells; and
 a processing device configured to communicate with the active UE to control the active UE to communicate directly with the second rising satellite;
 wherein the first setting satellite and the second rising satellite are transparent and configured to directly communicate with a modified base-station low PHY and un-modified standard 3GPP compliant UEs.

18. A satellite communication handover system configured for communication with a first setting satellite having a first field of view including a first plurality of cells in which an active User Equipment (UE) is located that is in direct communication with the first setting satellite, and also configured for communication with a second rising satellite having a second field of view, the first and second satellites having an overlapping field of view where the first field of view overlaps with the second field of view, and an overlapping plurality of cells located in the overlapping field of view, the overlapping plurality of cells including a cell in which the active UE is located, the satellite communication handover system comprising:
 a first feeder link and a first tracking antenna configured to communicate with the active UE via the first setting satellite directly serving the first plurality of cells and a second feeder link and a second tracking antenna configured to communicate with the second rising satellite serving the active UE directly in the second plurality of cells; and
 a processing device configured to communicate with the active UE to control the active UE to communicate directly with the second rising satellite;
 wherein the system is configured to support a configurable fixed round trip latency, and to set one or more timers accordingly related to a long RF path delay.

19. A satellite communication handover system configured for communication with a first setting satellite having a first field of view including a first plurality of cells in which an active User Equipment (UE) is located that is in direct communication with the first setting satellite, and also configured for communication with a second rising satellite having a second field of view, the first and second satellites having an overlapping field of view where the first field of view overlaps with the second field of view, and an overlapping plurality of cells located in the overlapping field of view, the overlapping plurality of cells including a cell in which the active UE is located, the satellite communication handover system comprising:
 a first feeder link and a first tracking antenna configured to communicate with the active UE via the first setting satellite directly serving the first plurality of cells and a second feeder link and a second tracking antenna configured to communicate with the second rising satellite serving the active UE directly in the second plurality of cells;
 a processing device configured to communicate with the active UE to control the active UE to communicate directly with the second rising satellite; and
 a long distance fronthaul that is configured to uses a fiber link to enable gateway site diversity and enlarge gateway field of view and footprint; and
 wherein fiber latency is encapsulated into delay compensation.

\* \* \* \* \*